United States Patent
Wells

(10) Patent No.: US 10,660,170 B2
(45) Date of Patent: *May 19, 2020

(54) LIGHTING SYSTEM FOR GROWING PLANTS

(71) Applicant: LUMIGROW, INC., Emeryville, CA (US)

(72) Inventor: Kevin Wells, San Rafael, CA (US)

(73) Assignee: LumiGrow, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,458

(22) Filed: Jan. 13, 2017

(65) Prior Publication Data
US 2019/0053353 A1 Feb. 14, 2019

Related U.S. Application Data

(63) Continuation-in-part of application No. 15/004,320, filed on Jan. 22, 2016, now Pat. No. 9,986,621.

(60) Provisional application No. 62/303,374, filed on Mar. 3, 2016.

(51) Int. Cl.
*H05B 37/02* (2006.01)
*A01G 7/04* (2006.01)
*H05B 33/08* (2020.01)
*A01G 9/20* (2006.01)
*A01G 9/24* (2006.01)

(52) U.S. Cl.
CPC ......... *H05B 37/0227* (2013.01); *A01G 7/045* (2013.01); *A01G 9/20* (2013.01); *A01G 9/24* (2013.01); *A01G 9/249* (2019.05); *H05B 33/0854* (2013.01); *H05B 33/0869* (2013.01); *H05B 37/0272* (2013.01)

(58) Field of Classification Search
CPC ........... H05B 37/0227; H05B 37/0234; H05B 37/0254; H05B 37/0272; H05B 37/0281
USPC .................................................. 315/308, 312
See application file for complete search history.

(56) References Cited

U.S. PATENT DOCUMENTS

| | | | |
|---|---|---|---|
| 8,847,514 B1 * | 9/2014 | Reynoso | A01G 7/045 315/307 |
| 2012/0216721 A1 | 8/2012 | Hesselbarth et al. | |
| 2015/0305108 A1 * | 10/2015 | Probasco | A01G 22/00 47/58.1 LS |
| 2016/0113213 A1 | 4/2016 | Berinsky | |
| 2016/0286732 A1 * | 10/2016 | Wu | A01G 22/00 |
| 2018/0007838 A1 * | 1/2018 | McCord | A01G 7/045 |

* cited by examiner

Primary Examiner — Tung X Le
(74) Attorney, Agent, or Firm — Troutman Sanders LLP

(57) ABSTRACT

A lighting system includes a computer, and a grow light array operatively coupled to the computer, wherein the grow light array includes a plurality of grow lights. The computer determines a location parameter of each grow light of the grow light array, wherein the location parameter corresponds to the location of a corresponding grow light. The grow light array adjusts an intensity of light to drive a light intensity sense parameter to match a desired light intensity sense parameter.

21 Claims, 9 Drawing Sheets

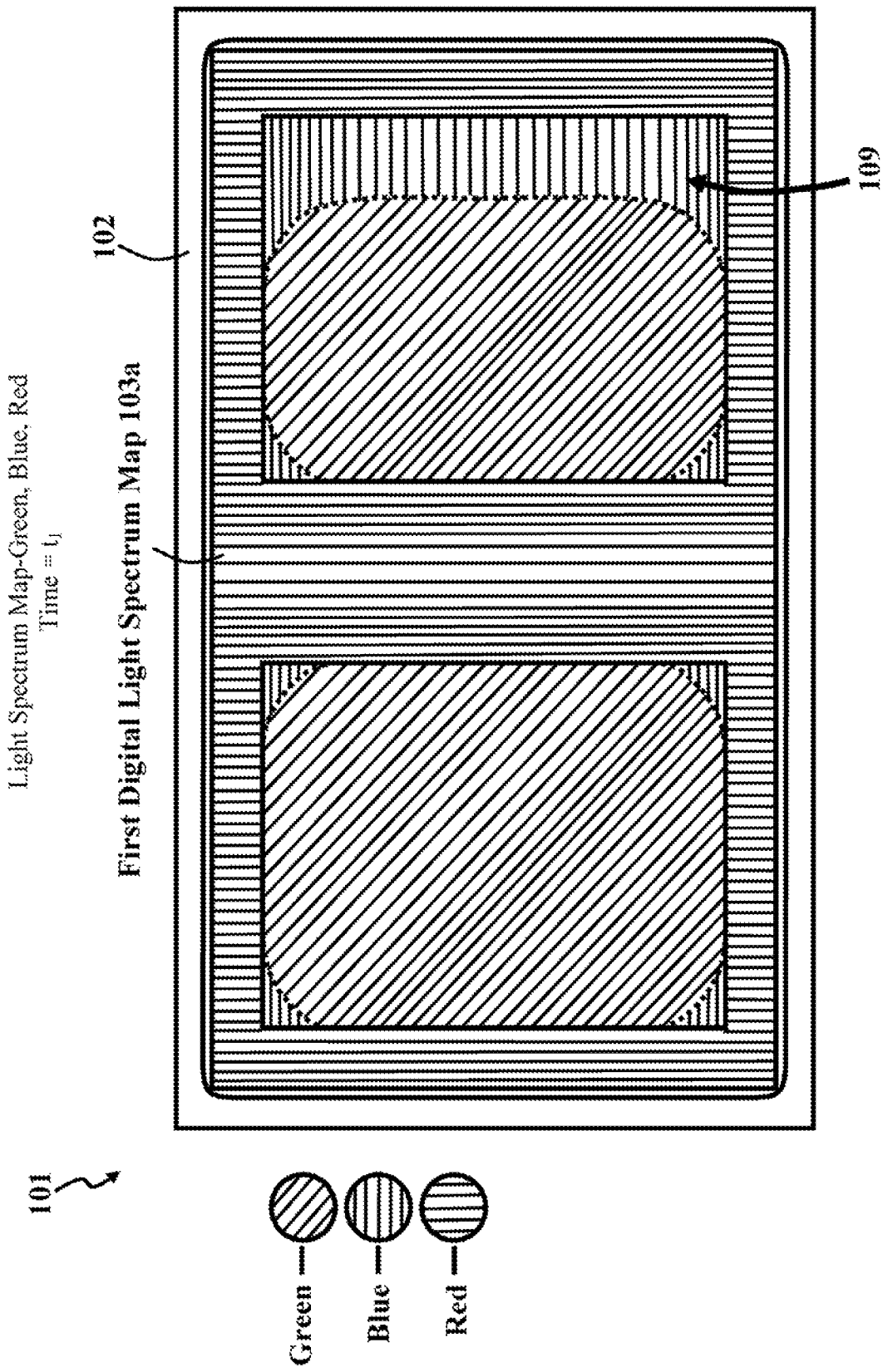

LIGHTING SYSTEM FOR GROWING PLANTS

CROSS-REFERENCE TO RELATED APPLICATIONS

This application is a continuation-in-part of U.S. patent application Ser. No. 15/004,320, filed on Jan. 22, 2016, the contents of which are incorporated herein by reference as though fully set forth herein.

This application claims priority of U.S. Provisional Application No. 62/303,374, filed on Mar. 3, 2016, the contents of which are incorporated herein by reference as though fully set forth herein.

BACKGROUND OF THE INVENTION

Field of the Invention

This invention relates generally to facilitating plant growth using light.

Description of the Related Art

Some lighting systems for growing plants utilize gas-based lights and other lighting systems utilize light emitting diodes (LEDs). Gas-based lights include high intensity discharge (HID) lights and compact fluorescent lights (CFL). HID lights include metal halide (MH) and high pressure sodium (HPS) lights. More information regarding lighting systems for growing plants can be found in U.S. Pat. No. 6,688,759 to Hadjimichael, the contents of which are incorporated herein by reference. Information regarding lighting systems that utilize LEDs can be found in U.S. Pat. No. 5,012,609 to Ignatius, et al., U.S. Pat. No. 5,278,432 to Ignatius, et al., U.S. Pat. No. 6,474,838 to Fang, et al., U.S. Pat. No. 6,602,275 to Sullivan, U.S. Pat. No. 6,921,182 to Anderson, et al., U.S. Patent Application Nos. 20040189555 to Capen, et al., 20070058368 to Partee, et al., U.S. Patent Application No. 20110125296 to Bucove, et al., U.S. Patent Application No. 20050030538 to Jaffar and International Application No. PCT/CA2007/001096 to Tremblay, et al., all of which are incorporated by reference as though fully set forth herein.

There are many different manufacturers that use light emitting diodes for the growing of plants. Some of these manufacturers include Homegrown Lights, Inc., which provides the Procyon 100, SuperLED, which provides the LightBlaze 400, Sunshine Systems, which provides the GrowPanel Pro, Theoreme Innovation, Inc., which provides the TI SmartLamp, and HID Hut, Inc., which provides the LED UFO.

However, it is desirable to provide a lighting system which allows the spectrum and/or intensity of the emitted light to be better controlled.

BRIEF SUMMARY OF THE INVENTION

The present invention is directed to a lighting system for facilitating the growth of plants. The novel features of the invention are set forth with particularity in the appended claims. The invention will be best understood from the following description when read in conjunction with the accompanying drawings.

BRIEF DESCRIPTION OF THE DRAWINGS

It should be noted that like reference numbers are used throughout the several views of the Drawings.

FIG. 1b is a more detailed block diagram of the lighting system of FIG. 1a.

FIG. 2a is a view of a first digital light spectrum map displayed by the computer of FIG. 1a, wherein the first digital light spectrum map corresponds to a light spectrum of the area of FIG. 1c at a time $t_1$.

DETAILED DESCRIPTION OF THE INVENTION

The invention disclosed herein is a lighting system for facilitating the growth of plants, wherein the lighting system provides a position indication of its location. The invention disclosed herein can be understood with reference to U.S. Pat. Nos. 8,297,782, 8,668,350, 9,310,027, and 9,310,049, the contents of all of which are incorporated herein by reference in their entirety. The invention disclosed herein can be understood with reference to the above-identified U.S. patent application Ser. No. 15/004,320 and U.S. Provisional Application No. 62/303,374. The position indications discussed herein can be of many different types of indications, such as an electrical signal. The electrical signal of the position indications can be of many different types of electrical signals, such as a digital and/or analog position signal.

Figure 1A:
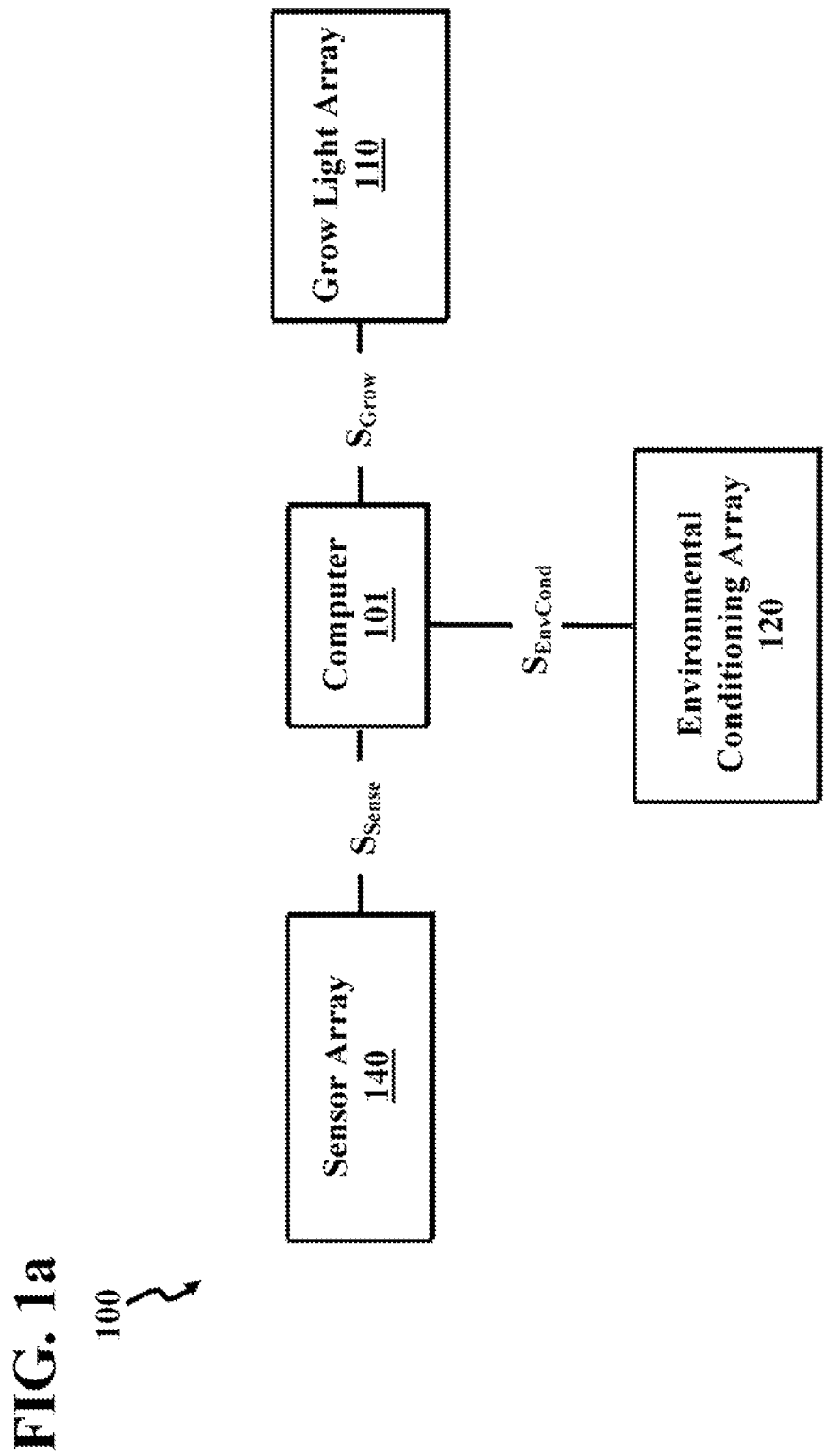
FIG. 1a is a block diagram of a lighting system, which includes a computer operatively coupled to a light sensor array, LED lighting system array, and environmental conditioning array.

FIG. 1a is a block diagram of a lighting system 100, which includes a computer 101. The computer 101 can be of many different types, such as a desktop and laptop computer. The computer 101 can also be a phone and tablet, such as a smart phone and IPAD. In general, the computer 101 includes a processor which processes data, such as digital and/or analog data. The data can be provided to the computer in many different ways, such as through a wired and/or wireless communication link. In some embodiments, the computer 101 includes a transceiver (not shown), which allows data to flow to and from the computer 101. The computer 101 typically includes a display device (not shown), such as a computer monitor, which displays information corresponding to the data. An example of the display device is shown as a display device 102 in at least FIGS. 2a, 2b, and 2c and FIGS. 3a, 3b, and 3c. The computer 101 is repeatably moveable between ON and OFF conditions. The computer operates and does not operate in the ON and OFF conditions, respectively. In the ON condition, the computer 101 is capable of processing data. In the OFF condition, the computer 101 is not capable of processing data.

The flow of data includes the data being transmitted and/or received. The data is often in the form of a signal, such as a radio signal, wherein the radio signal is flowed between the transceiver of the computer 101 and a transceiver of a grow light, as will be discussed in more detail below. The flow of radio signals between transceivers can be used to determine the locations of fixtures relative to each other. As each grow light has an affixed radio transceiver and knows both the transmit signal strength and received signal strength, it can estimate the distance between itself and other transceivers. While this assumes a homogenous radio environment, in most horticultural environments, this assumption generally holds. Additionally, as the light fixtures are nominally positioned per a light plan layout, the approximate distances between various fixtures are known a priori.

When light fixtures are installed in a greenhouse, mapping their relative positions to one another is desired to generate accurate visual mappings of sensor data. Assuming the fixtures are positioned approximately according to the light plan layout, the grow lights can provide a matrix of received radio signal strength relative to transmit strengths. From the light plan and this matrix, the locations of each light fixture in the greenhouse can be estimated with accuracy. This process is a form of trilateralization. Variations in this process are possible while achieving similar results. For example, the matrix data structure may only store information for the six or eight transceivers with the greatest signal strength ratio or could store information for every other modules' signal strength ratio.

In this embodiment, the lighting system 100 includes a sensor array 140 operatively coupled to the computer 101. In general, the sensor array 140 includes one or more sensors, which determine a sense parameter. The sense parameter can be of many different types of parameters, such as light intensity, light spectrum, temperature, humidity, gas type, wind speed, and wind direction, among others. It should be noted that the light spectrum corresponds to the light color, which varies with wavelength.

It is often useful to drive the sense parameter to a desired sense parameter. The sense parameter is driven to the desired sense parameter in response to driving a sense parameter value to a desired sense parameter value. In some situations, it is desirable to drive the difference between the sense parameter value and the desired sense parameter value to be a predetermined sense parameter value. A useful predetermined sense parameter value is zero. However, there are typically other useful predetermined sense parameter values that can be used.

The sensors of the sensor array 140 can be of many different types, several of which will be discussed in more detail below. In some embodiments, the sensors of the sensor array 140 are of the same type. For example, the sensor array 140 can include one or more temperature sensors. In another example, the sensor array 140 can include one or more humidity sensors. In other embodiments, the sensors of the sensor array 140 are of different types. For example, the sensor array 140 can include a temperature sensor and one or more humidity sensors. In another example, the sensor array 140 can include one or more gas sensors and one or more wind speed sensors. The sensor array 140 can also include one or more cameras. It should be noted that other combinations of sensors may be desired, and is generally chosen to determine a desired combination of sense parameters.

The sensor array 140 can be operatively coupled to the computer 101 in many different ways, such as through the wired and/or wireless communication link. More information regarding wired and wireless communication links is provided in U.S. patent application Ser. No. 15/004,320 and U.S. Provisional Application No. 62/303,374.

The sensor array 140 is operatively coupled to the computer 101 so that a sense signal $S_{Sense}$ can flow therebetween. In some situations, the sense signal $S_{Sense}$ flows between the computer 101 and sensor array 140 in response to the operation of the computer 101. In other situations, the sense signal $S_{Sense}$ flows between the computer 101 and sensor array 140 in response to the operation of the sensor array 140. The sense signal $S_{Sense}$ can be of many different types, such as a digital and/or analog sense signal. The sense signal $S_{Sense}$ can be included with the digital and analog data mentioned above, wherein the digital and analog data are processed by the computer 101.

The sense signal $S_{Sense}$ can include many different types of information. For example, the sense signal $S_{Sense}$ can include a sensor control signal which controls the operation of the sensor array 140. In some situations, the sensor array 140 has an ON condition in response to receiving the sensor control signal. The sense signal $S_{Sense}$ flows when the sensor array 140 has the ON condition. In other situations, the sensor array 140 has an OFF condition in response to receiving the sensor control signal. The sense signal $S_{Sense}$ does not flow when the sensor array 140 has the OFF condition. It should be noted that the sensor array 140 is repeatably moveable between the ON and OFF conditions. In some situations, the sensor array 140 provides the desired sense parameter in response to receiving the sensor control signal. The sensor array 140 can provide a selected sense parameter, selected from a plurality of sense parameters, in response to receiving the sensor control signal.

In another example, the sense signal $S_{Sense}$ includes information corresponding to the desired sense parameter determined by the operation of the sensor array 140. For example, in one situation, the sensor array 140 determines a light intensity in response to the operation of the sensor array 140. The sense signal $S_{Sense}$ includes a light intensity sense parameter corresponding to the light intensity determined by the sensor array 140. In another situation, the sensor array 140 determines a light spectrum in response to the operation of the sensor array 140. The sense signal $S_{Sense}$ includes a light spectrum sense parameter corresponding to the light spectrum determined by the sensor array 140. In some situations, the sensor array 140 determines a temperature in response to the operation of the sensor array 140. The sense signal $S_{Sense}$ includes a temperature sense parameter corresponding to the temperature determined by the sensor array 140. In some situations, the sensor array 140 determines a humidity in response to the operation of the sensor array 140. The sense signal $S_{Sense}$ includes a humidity sense parameter corresponding to the humidity determined by the sensor array 140. In some situations, the sensor array 140 determines a gas type in response to the operation of the sensor array 140. The sense signal $S_{Sense}$ includes a gas type sense parameter corresponding to the gas type determined by the sensor array 140. In some situations, the sensor array determines a wind speed in response to the operation of the sensor array 140. The sense signal $S_{Sense}$ includes a wind speed sense parameter corresponding to the wind speed determined by the sensor array 140. In some situations, the sensor array determines a wind direction in response to the operation of the sensor array 140. The sense signal $S_{Sense}$ includes a wind direction sense parameter corresponding to the wind direction determined by the sensor array 140. It should be noted that the local wind speed and/or wind direction can be adjusted in response to adjusting the operation of the fan. It should also be noted that one or more sense parameters can be determined by the sense array 140. For example, the sense array 140 can determine the light spectrum sense parameter and light intensity sense parameter.

It should also be noted that the sense signal $S_{Sense}$ can include one or more sense parameters. In some situations, the one or more sense parameters are of the same type. For example, the sense parameters can include a plurality of sense parameters corresponding to temperature. In another example, the sense parameters can include a plurality of sense parameters corresponding to humidity. In other situations, the one or more sense parameters are of different types. For example, the sense parameters can include a plurality of sense parameters corresponding to temperature and humidity. In another example, the sense parameters can include a plurality of sense parameters corresponding to humidity and wind speed and wind direction. It should be noted that other combinations of sense parameters may be desired.

In some embodiments, the sense signal $S_{Sense}$ includes a sense array position signal, which includes information corresponding to the position of the sensor array 140. For example, the sensor array 140 can provide a first sensor array position coordinate corresponding to a first sensor array position of the sensor array 140. The sensor array 140 can provide a second sensor array position coordinate corresponding to a second sensor array position of the sensor array 140, wherein the first and second sensor array positions are different. The first sensor array position coordinate is driven to match the second sensor array position coordinate in response to moving the sensor array 140 from the first sensor array position to the second sensor array position. The second sensor array position coordinate is driven to match the first sensor array position coordinate in response to moving the sensor array 140 from the second sensor array position to the first sensor array position. It should be noted that the sensor array 140 is repeatably moveable between the first and second sensor array positions.

In some embodiments, the sense array position coordinate corresponds to the coordinates determined by a Global Positioning System. For example, in one situation, the sensor array 140 provides a sense array position coordinate corresponding to a longitude and latitude of the sensor array 140, wherein the longitude and latitude are determined by the Global Positioning System. In other embodiments, the sense array position coordinate corresponds to the coordinates relative to an arbitrary location. The arbitrary location can correspond to many different types of locations. In one situation, the arbitrary location corresponds to the location of a corner of a grow bed. In another situation, the arbitrary location corresponds to the location of a corner of a green house. In general, the arbitrary location is chosen by the user to be a convenient location with which to determine the sense array position coordinate. The sense array position coordinate can be provided in many different ways, such as by using a sensor array positioning chip. Hence, the sensor array 140 can include the positioning chip disclosed in U.S. patent application Ser. No. 15/004,320 and U.S. Provisional Application No. 62/303,374.

In this embodiment, the lighting system 100 includes a grow light array 110 operatively coupled to the computer 101. In general, the grow light array 110 includes one or more grow lights, which provide a desired spectrum and/or intensity of light. The grow light array 110 can provide one or more spectrums of light. Further, the spectrum and/or intensity of the light provided by the grow light array 110 is adjustable. As mentioned above, the spectrum of light corresponds to the color of light.

The grow lights can be of many different types, such as LED and HID grow lights. It should be noted that, in general, the LED grow light includes an array of LEDs. More information regarding LED grow lights is provided in the above-identified patent and patent applications. It should be noted that the grow light array 110 can be embodied as the lighting system of U.S. patent application Ser. No. 15/004,320 and U.S. Provisional Application No. 62/303,374, wherein the grow light includes a communication module having a grow light positioning chip. Further, the grow light array 110 can be as disclosed in U.S. Pat. Nos. 8,297,782, 8,668,350, 9,310,027, and 9,310,049, as well as U.S. patent application Ser. No. 15/004,320 and U.S. Provisional Application No. 62/303,374.

In some embodiments, the grow lights of the grow light array 110 are of the same type. For example, the grow light array 110 can include one or more LED grow lights. In another example, the grow light array 110 can include one or more HID grow lights. In other embodiments, the grow lights of the grow light array 110 are of different types. For example, the grow light array 110 can include an LED grow light and one or more HID grow lights. In another example, the grow light array 110 can include one or more LED grow lights and one or more HID grow lights. It should be noted that other combinations of grow lights may be desired, and is generally chosen to provide the desired spectrum and/or intensity of light.

The grow light array 110 can be operatively coupled to the computer 101 in many different ways, such as through a wired and/or wireless communication link. More information regarding wired and wireless communication links is provided in U.S. patent application Ser. No. 15/004,320 and U.S. Provisional Application No. 62/303,374.

In this embodiment, the grow light array 110 is operatively coupled to the computer 101 so that a grow light array signal $S_{Grow}$, can flow therebetween. The grow light array signal $S_{Grow}$ can be of many different types, such as a digital and/or analog grow light signal. The grow light array signal $S_{Grow}$ can be included with the digital and analog data mentioned above, wherein the digital and analog data are processed by the computer 101. In some embodiments, the grow light array signal $S_{Grow}$ includes a grow light control signal, which includes information that controls the operation of the grow light array 110. For example, in one situation, the grow light array 110 has an ON condition in response to receiving the grow light control signal. In other situations, the grow light array 110 has an OFF condition in response to receiving the grow light control signal. In general, the grow light array 110 is repeatably moveable between the ON and OFF conditions in response to receiving the grow light control signal.

In some situations, the grow light array 110 provides the desired spectrum of light in response to receiving the grow light control signal. In another situation, the grow light array 110 provides the desired intensity of light in response to receiving the grow light control signal. In some situations, the grow light array 110 provides the desired intensity and spectrum of light in response to receiving the grow light control signal.

It should be noted that the grow light array 110 can drive the spectrum of light proximate to the sensor array 140 to match the desired spectrum of light. Hence, the light spectrum sense parameter can be driven to match a desired light spectrum sense parameter in response to adjusting the spectrum of light provided by the grow light array 110. Further, the grow light array 110 can drive the intensity of light proximate to the sensor array 140 to match the desired intensity of light. Hence, the light intensity sense parameter can be driven to match a desired light intensity sense parameter in response to adjusting the intensity of light provided by the grow light array 110.

In general, the grow light array 110 can adjust the spectrum of light proximate to the sensor array 140. Hence, the light spectrum sense parameter proximate to the sensor array 140 is adjustable in response to adjusting the operation of the grow light array 110. Further, the grow light array 110 can adjust the intensity of light proximate to the sensor array 140. Hence, the light intensity sense parameter proximate to the sensor array 140 is adjustable in response to adjusting the operation of the grow light array 110.

In some embodiments, the grow light array signal $S_{Grow}$ includes a grow light array position signal, which includes information that corresponds to the position of the grow light array 110. For example, the grow light array 110 can provide a first grow light array position coordinate corresponding to a first grow light array position of the grow light array 110. The grow light array 110 can provide a second grow light position coordinate corresponding to a second grow light array position of the grow light array 110, wherein the first and second grow light array positions are different. The first grow light array position coordinate is driven to match the second grow light array position coordinate in response to moving the grow light array 110 from the first grow light array position to the second grow light array position. The second grow light array position coordinate is driven to match the first grow light array position coordinate in response to moving the grow light array 110 from the second grow light array position to the first grow light array position. It should be noted that the grow light array 110 is repeatably moveable between the first and second grow light array positions.

In some embodiments, the grow light array position coordinate corresponds to the coordinates determined by a Global Positioning System. For example, in one situation, the grow light array 110 provides a grow light array position coordinate corresponding to a longitude and latitude of the grow light array 110, wherein the longitude and latitude are determined by the Global Positioning System. In other embodiments, the grow light array position coordinate corresponds to the coordinates relative to an arbitrary location. The arbitrary location can correspond to many different types of locations. In one situation, the arbitrary location corresponds to the location of a corner of a grow bed. In another situation, the arbitrary location corresponds to the location of a corner of a green house. In general, the arbitrary location is chosen by the user to be a convenient location with which to determine the grow light array position coordinate. The grow light array position coordinate can be provided in many different ways, such as by using a grow light array positioning chip. Hence, the grow light array 110 can include the positioning chip disclosed in U.S. patent application Ser. No. 15/004,320 and U.S. Provisional Application No. 62/303,374.

In this embodiment, the lighting system 100 includes an environmental conditioning array 120 operatively coupled to the computer 101. In general, the environmental conditioning array 120 includes one or more environmental conditioning devices, which adjust an environmental parameter. The environmental parameter can be of many different types of parameters, such as temperature, humidity, gas type, wind speed, and wind direction, among others. The environmental parameter is one that is capable of being sensed by the sensor array 140.

It is often useful to drive the environmental parameter to a desired environmental parameter. The environmental parameter is driven to the desired environmental parameter in response to driving an environmental parameter value to a desired environmental parameter value. In some situations, it is desirable to drive the difference between the environmental parameter value and the desired environmental parameter value to be a predetermined environmental parameter value. A useful predetermined environmental parameter value is zero. However, there are typically other useful predetermined environmental parameter values that can be used.

The environmental conditioning devices can be of many different types, such as an air conditioning (AC) unit, heating unit, humidifier, gas supply, and fan, among others. In some embodiments, the environmental conditioning devices of the environmental conditioning array 120 are of the same type. For example, the environmental conditioning array 120 can include one or more AC units. In another example, the environmental conditioning array 120 can include one or more humidifiers. In other embodiments, the environmental conditioning devices of the environmental conditioning array 120 are of different types. For example, the environmental conditioning array 120 can include an AC unit and one or more humidifiers. In another example, the environmental conditioning array 120 can include one or more heating units and one or more fans. It should be noted that other combinations of environmental conditioning devices may be desired, and is generally chosen to provide a desired environmental parameter.

In general, the environmental conditioning array 120 conditions the environment proximate to it. For example, the environmental conditioning array 120 decreases a temperature proximate to the environmental conditioning array 120 when it operates as the AC unit. The environmental conditioning array 120 increases the temperature proximate to the environmental conditioning array 120 when it operates as the heating unit. Further, the environmental conditioning array 120 adjusts a humidity proximate to the environmental conditioning array 120 when it operates as the humidifier. The environmental conditioning array 120 adjusts a gas concentration proximate to the environmental conditioning array 120 when it operates as the gas supply. Further, the environmental conditioning array 120 adjusts a wind speed proximate to the environmental conditioning array 120 when it operates as the fan. In some situations, the environmental conditioning array 120 adjusts a wind direction proximate to the environmental conditioning array 120 when it operates as a fan. In this way, the environmental conditioning array 120 conditions the environment proximate to it by adjusting the environmental parameter.

In some embodiments, the environmental conditioning array 120 conditions the environment proximate to the sensor array 140. For example, the environmental conditioning array 120 decreases the temperature proximate to the sensor array 140 when it operates as the AC unit. The environmental conditioning array 120 increases the temperature proximate to the sensor array 140 when it operates as the heating unit. Further, the environmental conditioning array 120 adjusts the humidity proximate to the sensor array 140 when it operates as the humidifier. The environmental conditioning array 120 adjusts the gas concentration proximate to the sensor array 140 when it operates as the gas supply. Further, the environmental conditioning array 120 adjusts a wind speed and/or direction proximate to the sensor array 140 when it operates as the fan. In this way, the environmental conditioning array 120 conditions the environment proximate to the sensor array 140 by adjusting the environmental parameter.

In some embodiments, the environmental conditioning array 120 conditions the environment proximate to the grow light array 110. For example, the environmental conditioning array 120 decreases the temperature proximate to the grow light array 110 when it operates as the AC unit. The environmental conditioning array 120 increases the temperature proximate to the grow light array 110 when it operates as the heating unit. Further, the environmental conditioning array 120 adjusts the humidity proximate to the grow light array 110 when it operates as the humidifier. The environmental conditioning array 120 adjusts the gas concentration proximate to the grow light array 110 when it operates as the gas supply. Further, the environmental conditioning array 120 adjusts a wind speed and/or direction proximate to the grow light array 110 when it operates as the fan. In this way, the environmental conditioning array 120 conditions the environment proximate to the grow light array 110 by adjusting the environmental parameter. It should be noted that the environmental conditioning array 120 can condition the environment proximate to any combination of the environmental conditioning array 120, sensor array 140, and grow light array 110.

The environmental conditioning array 120 is operatively coupled to the computer 101 so that an environmental conditioning array signal $S_{EnvCond}$ can flow therebetween. The environmental conditioning array signal $S_{EnvCond}$ can be of many different types, such as a digital and/or analog environmental control signal. The environmental conditioning array signal $S_{EnvCond}$ can be included with the digital and analog data mentioned above, wherein the digital and analog data are processed by the computer 101. The environmental control signal can include many different types of information. In some embodiments, the environmental control signal includes information that controls the operation of the environmental conditioning array 120. For example, in one situation, the environmental conditioning array 120 conditions the environment proximate to it in response to receiving the environmental control signal. In another situation, the environmental conditioning array 120 conditions the environment proximate to the sensor array 140 in response to receiving the environmental control signal. In another situation, the environmental conditioning array 120 conditions the environment proximate to the grow light array 110 in response to receiving the environmental control signal. It should be noted that the environmental conditioning array 120 can condition the environment proximate to any combination of the environmental conditioning array 120, sensor array 140, and grow light array 110 in response to receiving the environmental control signal.

In some situations, the environmental conditioning array 120 has an ON condition in response to receiving the environmental control signal. In other situations, the environmental conditioning array 120 has an OFF condition in response to receiving the environmental control signal. In general, the environmental conditioning array 120 is repeatably moveable between the ON and OFF conditions in response to receiving the environmental control signal.

In some embodiments, the environmental conditioning array signal $S_{EnvCond}$ includes an environmental conditioning device position signal, which includes information that corresponds to the position of the environmental conditioning array 120. For example, the environmental conditioning array 120 can provide a first environmental conditioning array position coordinate corresponding to a first environmental conditioning array position of the environmental conditioning array 120. The environmental conditioning array 120 can provide a second environmental conditioning array position coordinate corresponding to a second environmental conditioning array position of the environmental conditioning array 120, wherein the first and second environmental conditioning array positions are different. The first environmental conditioning array position coordinate is driven to match the second environmental conditioning array position coordinate in response to moving the environmental conditioning array 120 from the first environmental conditioning array position to the second environmental conditioning array position. The second environmental conditioning array position coordinate is driven to match the first environmental conditioning array position coordinate in response to moving the environmental conditioning array 120 from the second environmental conditioning array position to the first environmental conditioning array position. It should be noted that the environmental conditioning array 120 is repeatably moveable between the first and second environmental conditioning array positions.

In some embodiments, the environmental conditioning array position coordinate corresponds to the coordinates determined by a Global Positioning System. For example, in one situation, the environmental conditioning array 120 provides an environmental conditioning array position coordinate corresponding to a longitude and latitude of the environmental conditioning array 120, wherein the longitude and latitude are determined by the Global Positioning System. In other embodiments, the environmental conditioning array position coordinate corresponds to the coordinates relative to an arbitrary location. The arbitrary location can correspond to many different types of locations. In one situation, the arbitrary location corresponds to the location of a corner of a grow bed. In another situation, the arbitrary location corresponds to the location of a corner of a green house. In general, the arbitrary location is chosen by the user to be a convenient location with which to determine the grow light array position coordinate. The environmental conditioning array position coordinate can be provided in many different ways, such as by using an environmental conditioning array positioning chip. Hence, the environmental conditioning array 120 can include the positioning chip disclosed in U.S. patent application Ser. No. 15/004,320 and U.S. Provisional Application No. 62/303,374.

Figure 1B:
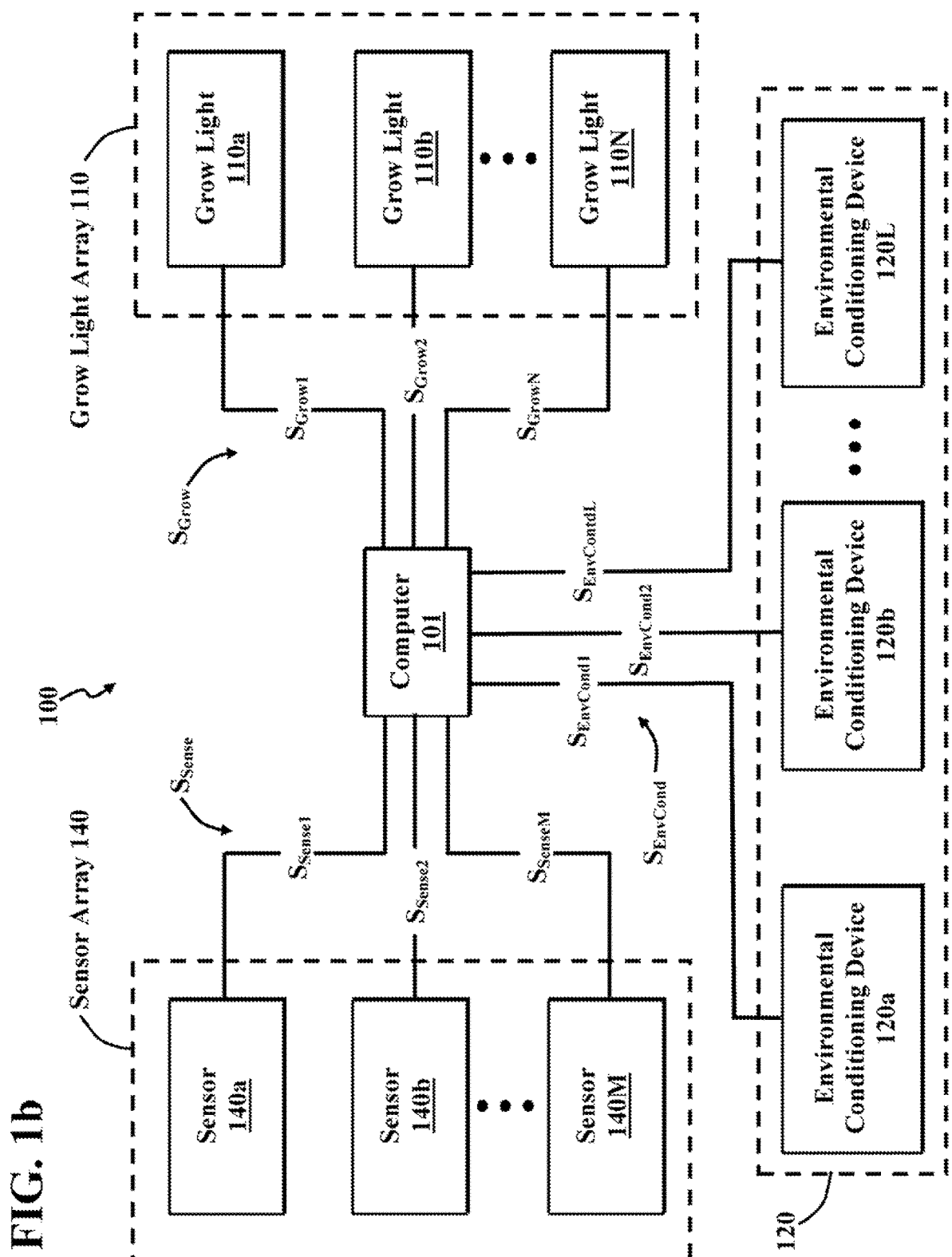

FIG. 1b is a more detailed block diagram of the lighting system 100 of FIG. 1a. In this embodiment, the lighting system 100 includes the sensor array 140 operatively coupled to the computer 101. In general, the sensor array 140 includes one or more sensors. In this embodiment, the sensor array 140 includes one or more sensors 140a, 140b, . . . , 140M, wherein M is a whole number greater than or equal to one. In some embodiments, the sensor array 140 includes a plurality of sensors 140a, 140b, . . . , 140M, wherein M is a whole number greater than one. In this way, the sensor array 140 includes one or more sensors.

The sensors 140a, 140b, . . . , 140M can be of many different types of sensors, several of which were discussed in more detail above. In general, the sensors 140*a*, 140*b*, . . . , 140M include one or more types of sensors which determine one or more sense parameters, such as light intensity, light spectrum, temperature, humidity, gas type, wind speed, and wind direction, among others.

It is often useful to drive the sense parameters to corresponding desired sense parameters. The sense parameters are driven to the corresponding desired sense parameters in response to driving the sense parameter values to the corresponding desired sense parameter values. In some situations, it is desirable to drive the difference between the sense parameter values and the corresponding desired sense parameter values to be predetermined sense parameter values. Useful corresponding predetermined sense parameter values are zero. However, there are typically other useful predetermined sense parameter values that can be used.

It should be noted that, in some embodiments, the sensors 140*a*, 140*b*, . . . , 140M are all the same type of sensors so that the same sense parameter is determined by each. For example, the sensor array 140 can include the sensors 140*a*, 140*b*, and 140*c*, which are all temperature sensors which each determine a corresponding temperature sense parameter. In another example, the sensor array 140 can include the sensors 140*a*, 140*b*, 140*c*, and 140*d*, which are all humidity sensors which each determine a corresponding humidity sense parameter. The sensor array 140 can include the sensors 140*a*, 140*b*, 140*c*, and 140*d*, which are all gas type sensors which each determine a corresponding gas type sense parameter. Further, the sensor array 140 can include the sensors 140*a*, 140*b*, 140*c*, and 140*d*, which are all wind sensors which each determine a corresponding wind speed and/or direction sense parameter.

In other embodiments, the sensors 140*a*, 140*b*, . . . , 140M include two or more different types of sensors so that two or more different types of sense parameters are determined. For example, the sensor array 140 can include the sensors 140*a*, 140*b*, and 140*c*, wherein the sensors 140*a* and 140*b* are temperature sensors, and the sensor 140*c* is a humidity sensor. In another example, the sensor array 140 includes the sensors 140*a*, 140*b*, 140*c*, 140*d*, and 140*e*, wherein the sensors 140*a* and 140*b* are temperature sensors, the sensors 140*c* and 140*d* are gas type sensors, and the sensor 140*e* is a wind speed sensor. It should be noted that other combinations of sensors may be desired.

As mentioned above, the sensor array 140 can be operatively coupled to the computer 101 in many different ways, such as through the wired and/or wireless communication link. In this embodiment, one or more of the sensors 140*a*, 140*b*, . . . , 140M are operatively coupled to the computer 101 through any combination of wired and wireless communication links. More information regarding wired and wireless communication links is provided in U.S. patent application Ser. No. 15/004,320 and U.S. Provisional Application No. 62/303,374. It should be noted that, in some embodiments, one or more of the sensors 140*a*, 140*b*, . . . , 140M are carried by a selected grow light of the grow light array 110. For example, the sensor 140*a* can be carried by the grow light 110*a*. Further, the sensor 140*b* can be carried by the grow light 110*b*. In some embodiments, the sensors 140*a* and 140*b* are carried by the grow light 110*a*.

In this embodiment, the sensors of the sensor array 140 are operatively coupled to the computer 101 so that a corresponding sense signal flows therebetween. For example, the sensor 140*a* is operatively coupled to the computer 101 so that a sense signal $S_{Sense1}$ flows therebetween. The sensor 140*b* is operatively coupled to the computer 101 so that a sense signal $S_{Sense2}$ flows therebetween.

In general, the sensor 140M is operatively coupled to the computer 101 so that a sense signal $S_{SenseM}$ flows therebetween. It should be noted that the sense signals $S_{Sense1}$, $S_{Sense2}$, . . . , $S_{SenseM}$ are included with the sense signal $S_{Sense}$ of FIGS. 1*a* and 1*b*.

In some situations, the sense signals $S_{Sense1}$, $S_{Sense2}$, . . . , $S_{SenseM}$ flow between the computer 101 and the corresponding sensors 140*a*, 140*b*, . . . , 140M in response to the operation of the computer 101. In other situations, the sense signals $S_{Sense1}$, $S_{Sense2}$, . . . , $S_{SenseM}$ flow between the computer 101 and the corresponding sensors 140*a*, 140*b*, . . . , 140M in response to the operation of the sensors 140*a*, 140*b*, . . . , 140M. The sense signals $S_{Sense1}$, $S_{Sense2}$, . . . , $S_{SenseM}$ can be of many different types, such as digital and/or analog sense signals. The sense signals, $S_{Sense2}$, . . . , $S_{SenseM}$ can be included with the digital and analog data mentioned above, wherein the digital and analog data are processed by the computer 101.

The sense signals $S_{Sense1}$, $S_{Sense2}$, . . . , $S_{SenseM}$ can include many different types of information. For example, one or more of the sense signals $S_{Sense1}$, $S_{Sense2}$, . . . , $S_{SenseM}$ can include the sensor control signal which controls the operation of one or more of the sensors 140*a*, 140*b*, . . . , 140M. In some situations, one or more of the sensors 140*a*, 140*b*, . . . , 140M have an ON condition in response to receiving the sensor control signal. In other situations, one or more of the sensors 140*a*, 140*b*, . . . , 140M have an OFF condition in response to receiving the sensor control signal. It should be noted that the sensors 140*a*, 140*b*, . . . , 140M are repeatably moveable between the ON and OFF conditions in response to receiving the sensor control signal. In some situations, one or more of the sensors 140*a*, 140*b*, . . . , 140M provides the desired sense parameter in response to receiving the sensor control signal. One or more of the sensors 140*a*, 140*b*, . . . , 140M can provide the selected sense parameter, selected from a plurality of sense parameters, in response to receiving the sensor control signal. In this way, the sense signals $S_{Sense1}$, $S_{Sense2}$, . . . , $S_{SenseM}$ flow between the computer 101 and one or more of the sensors 140*a*, 140*b*, . . . , 140M in response to the operation of the computer 101.

In another example, one or more of the sensors 140*a*, 140*b*, . . . , 140M include information corresponding to the desired sense parameter determined by the operation of one or more of the sensors 140*a*. 140*b*, . . . , 140M. For example, in one situation, one or more of the sensors 140*a*, 140*b*, . . . , 140M determines the light intensity in response to the operation of one or more of the sensors 140*a*, 140*b*, . . . , 140M. One or more of the sense signals $S_{Sense1}$, $S_{Sense2}$, . . . , $S_{SenseM}$ includes the light intensity sense parameter corresponding to the light intensity determined by one or more of the sensors 140*a*, 140*b*, . . . , 140M. In another situation, one or more of the sensors 140*a*, 140*b*, . . . , 140M determines the light spectrum in response to the operation of one or more of the sensors 140*a*, 140*b*, . . . , 140M. One or more of the sense signals $S_{Sense1}$, $S_{Sense2}$, . . . , $S_{SenseM}$ includes the light spectrum sense parameter corresponding to the light spectrum determined by one or more of the sensors 140*a*, 140*b*, . . . , 140M. In some situations, one or more of the sensors 140*a*, 140*b*, . . . , 140M determines the temperature in response to the operation of the one or more of the sensors 140*a*, 140*b*, . . . , 140M. One or more of the sense signals $S_{Sense1}$, $S_{Sense2}$, . . . , $S_{SenseM}$ includes the temperature sense parameter corresponding to the temperature determined by one or more of the sensors 140*a*, 140*b*, . . . , 140M. In some situations, one or more of the sensors 140*a*, 140*b*, . . . , 140M determines the humidity in response to the operation of the one or more of the sensors $140a$, $140b$, ..., $140M$. One or more of the sense signals $S_{Sense1}$, $S_{Sense2}$, ..., $S_{SenseM}$ includes the humidity sense parameter corresponding to the humidity determined by one or more of the sensors $140a$, $140b$, ..., $140M$.

In some situations, one or more of the sensors $140a$, $140b$, ..., $140M$ determines the gas type in response to the operation of one or more of the sensors $140a$, $140b$, ..., $140M$. One or more of the sense signals $S_{Sense1}$, $S_{Sense2}$, ..., $S_{SenseM}$ includes the gas type sense parameter corresponding to the gas type determined by one or more of the sensors $140a$, $140b$, ..., $140M$. In some situations, one or more of the sensors $140a$, $140b$, ..., $140M$ determines the wind speed in response to the operation of one or more of the sensors $140a$, $140b$, ..., $140M$. One or more of the sense signals $S_{Sense1}$, $S_{Sense2}$, ..., $S_{SenseM}$ includes the wind speed sense parameter corresponding to the wind speed determined by one or more of the sensors $140a$, $140b$, ..., $140M$. In some situations, one or more of the sensors $140a$, $140b$, ..., $140M$ determines the wind direction in response to the operation of one or more of the sensors $140a$, $140b$, ..., $140M$. One or more of the sense signals $S_{Sense1}$, $S_{Sense2}$, ..., $S_{SenseM}$ includes the wind direction sense parameter corresponding to the wind direction determined by one or more of the sensors $140a$, $140b$, ..., $140M$. In this way, the sense signals $S_{Sense1}$, $S_{Sense2}$, ..., $S_{SenseM}$ flow between the computer $101$ and one or more of the sensors $140a$, $140b$, ..., $140M$ in response to the operation of the sensors $140a$, $140b$, ..., $140M$.

In some embodiments, the sense signal $S_{Sense}$ includes the sense array position signal, which includes information that corresponds to the position of the sensors of the sensor array $140$. For example, in one situation, at least one of the sensors $140a$, $140b$, ..., $140M$ provides a sensor position coordinate corresponding to the position of the corresponding sensor $140a$, $140b$, ..., $140M$. For example, the sensor $140a$ can provide a first sensor position coordinate corresponding to a first sensor position of the sensor $140a$. The sensor $140a$ can provide a second sensor position coordinate corresponding to a second sensor position of the sensor $140a$, wherein the first and second sensor positions of the sensor $140a$ are different. The first sensor position coordinate is driven to match the second sensor position coordinate in response to moving the sensor $140a$ from the first sensor position to the second sensor position. The second sensor position coordinate is driven to match the first sensor position coordinate in response to moving the sensor $140a$ from the second sensor position to the first sensor position. It should be noted that the sensor $140a$ is repeatably moveable between the first and second sensor positions.

The sensor $140b$ can provide a third sensor position coordinate corresponding to a first sensor position of the sensor $140b$. The sensor $140b$ can provide a fourth sensor position coordinate corresponding to a second sensor position of the sensor $140b$, wherein the third and fourth positions of the sensor $140b$ are different. The third sensor position coordinate is driven to match the fourth sensor position coordinate in response to moving the sensor $140b$ from the third sensor position to the fourth sensor position. The fourth sensor position coordinate is driven to match the third sensor position coordinate in response to moving the sensor $140b$ from the fourth sensor position to the third sensor position. It should be noted that the sensor $140b$ is repeatably moveable between the third and fourth sensor positions. In general, the sensor $140M$ can provide an $M^{th}$ sensor position coordinate corresponding to the $M^{th}$ sensor position of the sensor $140M$, wherein the sensor $140M$ is repeatably moveable between the M sensor positions.

The sense array position coordinates can correspond to many different types of coordinates, such as the longitude and latitude. In some embodiments, the sense array position coordinates correspond to the coordinates determined by the Global Positioning System. In other embodiments, the sense array position coordinates correspond to the coordinates relative to an arbitrary location. The arbitrary location can correspond to many different types of locations. In one situation, the arbitrary location corresponds to the location of a corner of a grow bed. In another situation, the arbitrary location corresponds to the location of a corner of a green house. In general, the arbitrary location is chosen by the user to be a convenient location with which to determine the sense array position coordinates. The sense array position coordinates can be provided in many different ways, such as by including a sensor array positioning chip with each of the sensors $140a$, $140b$, ..., $140M$. Hence, the sensor array $140$ can include one or more positioning chips.

In this embodiment, the lighting system $100$ includes the grow light array $110$ operatively coupled to the computer $101$. In general, the grow light array $110$ includes one or more grow lights, which provide a desired spectrum and/or intensity of light. In this embodiment, the grow light array $110$ includes one or more grow lights $110a$, $110b$, ..., $110N$, wherein N is a whole number greater than or equal to one. In some embodiments, the grow light array $110$ includes a plurality of grow lights $110a$, $110b$, ..., $110N$, wherein N is a whole number greater than one. In this way, the grow light array $110$ includes one or more grow lights.

The grow lights $110a$, $110b$, ..., $110N$ can be of many different types, several of which are discussed in more detail above. More information regarding grow lights is provided in the above-identified patent and patent applications. It should be noted that the grow lights $110a$, $110b$, ..., $110N$ can be embodied as the grow lights of U.S. patent application Ser. No. 15/004,320 and U.S. Provisional Application No. 62/303,374, wherein the grow lights $110a$, $110b$, ..., $110N$ include a communication module having a grow light positioning chip. Further, the grow lights $110a$, $110b$, ..., $110N$ can be of many other different types of grow lights, such as those disclosed in U.S. Pat. Nos. 8,297,782 and 8,668,350 and U.S. Patent Application Nos. 20130294065 and 20130293156, wherein the grow lights include LEDs. In general, the grow lights $110a$, $110b$, ..., $110N$ can provide one or more spectrums of light. Further, the spectrum and/or intensity of the light provided by the grow lights $110a$, $110b$, ..., $110N$ is adjustable.

It should be noted that, in some embodiments, the grow lights $110a$, $110b$, ..., $110N$ are all the same type of grow lights so that the same sense parameter is determined. For example, the grow light array $110$ can include the grow lights $110a$, $110b$, and $110c$, which are all LED grow lights. In another example, the grow light array $110$ can include the grow lights $110a$, $110b$, $110c$, and $110d$, which are all HID grow lights.

In other embodiments, the grow lights $110a$, $110b$, ..., $110N$ include two or more different types of grow lights. For example, the grow light array $110$ can include the grow lights $110a$, $110b$, and $110c$, wherein the grow lights $110a$ and $110b$ are LED grow lights, and the grow light $110c$ is an HID grow light. In another example, the grow light array $110$ includes the grow lights $110a$, $110b$, $110c$, $110d$, and $110e$, wherein the grow lights $110a$ and $110b$ are LED grow lights, the grow lights $110c$ and $110d$ are metal halide grow lights, and the grow light 110e is a high pressure sodium grow light. It should be noted that other combinations of grow lights may be desired.

As mentioned above, the grow light array 110 can be operatively coupled to the computer 101 in many different ways, such as through a wired and/or wireless communication link. Hence, one or more of the grow lights 110a, 110b, . . . , 110N can be operatively coupled to the computer 101 through any combination of wired and wireless communication links. In this way, the grow lights 110a, 110b, . . . , 110N are operatively in communication with the computer 101. More information regarding wired and wireless communication links is provided in U.S. patent application Ser. No. 15/004,320 and U.S. Provisional Application No. 62/303,374.

In this embodiment, the grow lights of the grow light array 110 are operatively coupled to the computer 101 so that a corresponding grow light signal flows therebetween. For example, the grow light 110a is operatively coupled to the computer 101 so that a grow light signal $S_{Grow1}$ flows therebetween. The grow light 110b is operatively coupled to the computer 101 so that a grow light signal $S_{Grow2}$ flows therebetween. In general, the grow light 110N is operatively coupled to the computer 101 so that a grow light signal $S_{GrowN}$ flows therebetween. It should be noted that the grow light signals $S_{Grow1}$, $S_{Grow2}$, . . . , $S_{GrowN}$ are included with the light array grow light signal $S_{Grow}$ of FIGS. 1a and 1b. The grow light signals $S_{Grow1}$, $S_{Grow2}$, . . . , $S_{GrowN}$ can be of many different types, such as the digital and/or analog grow light signal. The grow light signals $S_{Grow1}$, $S_{Grow2}$, . . . , $S_{GrowN}$ can be included with the digital and analog data mentioned above, wherein the digital and analog data are processed by the computer 101.

The grow light signals $S_{Grow1}$, $S_{Grow2}$, . . . , $S_{GrowN}$ include information that control the operation of the corresponding grow lights 110a, 110b, . . . , 110N. The information can be of many different types, such as current, voltage, power, ON indication, OFF indication, light intensity, and light spectrum, among others. For example, the grow light signal $S_{Grow1}$ can include a first digital grow light control signal, which includes information that controls the operation of the grow light 110a. In one situation, the grow light 110a provides the desired spectrum of light in response to receiving the first digital grow light control signal. In another situation, the grow light 110a provides the desired intensity of light in response to receiving the first digital grow light control signal. In some situations, the grow light 110a provides the desired intensity and spectrum of light in response to receiving the first digital grow light control signal.

Further, the grow light signal $S_{Grow2}$ can include a second digital grow light control signal, which includes information that controls the operation of the grow light 110b. In one situation, the grow light 110b provides the desired spectrum of light in response to receiving the second digital grow light control signal. In another situation, the grow light 110b provides the desired intensity of light in response to receiving the second digital grow light control signal. In some situations, the grow light 110b provides the desired intensity and spectrum of light in response to receiving the second digital grow light control signal.

In general, the grow light signal $S_{GrowN}$ can include an $N^{th}$ digital grow light control signal, which includes information that controls the operation of the grow light 110N. In one situation, the grow light 110N provides the desired spectrum of light in response to receiving the $N^{th}$ digital grow light control signal. In another situation, the grow light 110N provides the desired intensity of light in response to receiving the $N^{th}$ digital grow light control signal. In some situations, the grow light 110N provides the desired intensity and spectrum of light in response to receiving the $N^{th}$ digital grow light control signal.

In some embodiments, one or more of the grow light signals $S_{Grow1}$, $S_{Grow2}$, . . . , $S_{GrowN}$ include a corresponding grow light position signal, $S_{Position1}$, $S_{Position2}$, . . . , $S_{PositionN}$, which includes information that corresponds to the position of the respective grow lights grow lights 110a, 110b, . . . , 110N. For example, the grow light 110a can provide a first grow light position coordinate corresponding to a first grow light position of the grow light 110a. The grow light 110a can provide a second grow light position coordinate corresponding to a second grow light position of the grow light 110a, wherein the first and second grow light positions of the grow light 110a are different. The first grow light position coordinate is driven to match the second grow light position coordinate in response to moving the grow light 110a from the first grow light position to the second grow light position. The second grow light position coordinate is driven to match the first grow light position coordinate in response to moving the grow light 110a from the second grow light position to the first grow light position. It should be noted that the grow light 110a is repeatably moveable between the first and second grow light positions.

The grow light 110b can provide a third grow light position coordinate corresponding to a first position of the grow light 110b. The grow light 110b can provide a fourth grow light position coordinate corresponding to a second position of the grow light 110b, wherein the third and fourth positions of the grow light 110b are different. The third grow light position coordinate is driven to match the fourth grow light position coordinate in response to moving the grow light 110b from the third position to the fourth position. The fourth grow light position coordinate is driven to match the third grow light position coordinate in response to moving the grow light 110b from the fourth position to the third position. It should be noted that the grow light 110b is repeatably moveable between the third and fourth grow light positions. In general, the grow light 110N can provide an $N^{th}$ grow light position coordinate corresponding to the $N^{th}$ position of the grow light 110N, wherein the grow light 110N is repeatably moveable between the N grow light positions.

The grow light position coordinates can correspond to many different types of coordinates, such as the longitude and latitude. In some embodiments, the grow light position coordinates correspond to the coordinates determined by the Global Positioning System. In other embodiments, the grow light position coordinates correspond to the coordinates relative to an arbitrary location. The arbitrary location can correspond to many different types of locations. In one situation, the arbitrary location corresponds to the location of a corner of a grow bed. In another situation, the arbitrary location corresponds to the location of a corner of a green house. In general, the arbitrary location is chosen by the user to be a convenient location with which to determine the grow light position coordinates. The grow light position coordinates can be provided in many different ways, such as by including a grow light positioning chip with each of the grow lights 110a, 110b, . . . , 110N. Hence, the grow light array 110 can include one or more positioning chips.

As mentioned above, the lighting system 100 includes the environmental conditioning array 120 operatively coupled to the computer 101. In this embodiment, the environmental conditioning array 120 includes environmental conditioning devices 120a, 120b, . . . , 120L, wherein L is a whole number greater than or equal to one. In some embodiments, the environmental conditioning array 120 includes a plurality of environmental conditioning devices 120a, 120b, . . . , 120L, wherein L is a whole number greater than one. In this way, the environmental conditioning array 120 includes one or more environmental conditioning devices.

In general, the environmental conditioning array 120 includes one or more environmental conditioning devices, which adjust one or more of the environmental parameters. Hence, in this embodiment, the environmental conditioning devices 120a, 120b, . . . , 120L adjust one or more of the desired environmental parameters. The desired environmental parameters can be one or more of the temperature, humidity, gas type, wind speed, and wind direction, among others. The desired environmental parameters are ones that are capable of being sensed by the sensors 140a, 140b, . . . , 140M of the sensor array 140.

It is often useful to drive the environmental parameters to corresponding desired environmental parameters. The environmental parameters are driven to the corresponding desired environmental parameters in response to driving the environmental parameter values to the corresponding desired environmental parameter values. In some situations, it is desirable to drive the difference between the environmental parameter values and the corresponding desired environmental parameter values to be predetermined environmental parameter values. Useful corresponding predetermined environmental parameter values are zero. However, there are typically other useful predetermined environmental parameter values that can be used.

The environmental conditioning devices 120a, 120b, . . . , 120L can be of many different types, such as an air conditioning (AC) unit, heating unit, humidifier, gas supply, and fan, among others. In some embodiments, the environmental conditioning devices 120a, 120b, . . . , 120L are of the same type. For example, the environmental conditioning devices 120a, 120b, . . . , 120L can include one or more AC units. In another example, the environmental conditioning devices 120a, 120b, . . . , 120L can include one or more humidifiers. In other embodiments, the environmental conditioning devices 120a, 120b, . . . , 120L are of different types. For example, the environmental conditioning devices 120a, 120b, . . . , 120L can include an AC unit and one or more humidifiers. In another example, the environmental conditioning devices 120a, 120b, . . . , 120L can include one or more heating units and one or more fans. It should be noted that other combinations of environmental conditioning devices may be desired.

The environmental conditioning devices 120a, 120b, . . . , 120L condition the environment proximate thereto. For example, the environmental conditioning device 120a decreases the temperature proximate to it when operating as the AC unit. The environmental conditioning device 120a increases the temperature proximate to it operating as the heating unit. Further, the environmental conditioning device 120a adjusts the humidity proximate to it when operating as the humidifier. The environmental conditioning device 120a adjusts the gas concentration proximate to it when operating as the gas supply. Further, the environmental conditioning device 120a adjusts a wind speed and/or direction proximate to it when operating as the fan. In this way, the environmental conditioning device 120a conditions the environment proximate to it by adjusting the environmental parameter.

Further, the environmental conditioning device 120b decreases the temperature proximate to it when operating as the AC unit. The environmental conditioning device 120b increases the temperature proximate to it operating as the heating unit. Further, the environmental conditioning device 120b adjusts the humidity proximate to it when operating as the humidifier. The environmental conditioning device 120b adjusts the gas concentration proximate to it when operating as the gas supply. Further, the environmental conditioning device 120b adjusts a wind speed and/or direction proximate to it when operating as the fan. In this way, the environmental conditioning device 120b conditions the environment proximate to it by adjusting the environmental parameter.

In general, the environmental conditioning device 120L decreases the temperature proximate to it when operating as the AC unit. The environmental conditioning device 120L increases the temperature proximate to it operating as the heating unit. Further, the environmental conditioning device 120L adjusts the humidity proximate to it when operating as the humidifier. The environmental conditioning device 120L adjusts the gas concentration proximate to it when operating as the gas supply. Further, the environmental conditioning device 120L adjusts a wind speed and/or direction proximate to it when operating as the fan. In this way, the environmental conditioning device 120L conditions the environment proximate to it by adjusting the environmental parameter.

In some embodiments, the environmental conditioning devices 120a, 120b, . . . , 120L condition the environment proximate to one or more of the sensors 140a, 140b, . . . , 140M. For example, the environmental conditioning device 120a decreases the temperature proximate to one or more of the sensors 140a, 140b, . . . , 140M when operating as the AC unit. The environmental conditioning device 120a increases the temperature proximate to one or more of the sensors 140a, 140b, . . . , 140M operating as the heating unit. Further, the environmental conditioning device 120a adjusts the humidity proximate to one or more of the sensors 140a, 140b, . . . , 140M when operating as the humidifier. The environmental conditioning device 120a adjusts the gas concentration proximate to one or more of the sensors 140a, 140b, . . . , 140M when operating as the gas supply. Further, the environmental conditioning device 120a adjusts a wind speed and/or direction proximate to one or more of the sensors 140a, 140b, . . . , 140M when operating as the fan. In this way, the environmental conditioning device 120a conditions the environment proximate to one or more of the sensors 140a, 140b, . . . , 140M by adjusting the environmental parameter.

Further, the environmental conditioning device 120b decreases the temperature proximate to one or more of the sensors 140a, 140b, . . . , 140M when operating as the AC unit. The environmental conditioning device 120b increases the temperature proximate to one or more of the sensors 140a, 140b, . . . , 140M operating as the heating unit. Further, the environmental conditioning device 120b adjusts the humidity proximate to one or more of the sensors 140a, 140b, . . . , 140M when operating as the humidifier. The environmental conditioning device 120b adjusts the gas concentration proximate to one or more of the sensors 140a, 140b, . . . , 140M when operating as the gas supply. Further, the environmental conditioning device 120b adjusts a wind speed and/or direction proximate to one or more of the sensors 140a, 140b, . . . , 140M when operating as the fan. In this way, the environmental conditioning device 120b conditions the environment proximate to one or more of the sensors 140a, 140b, . . . , 140M by adjusting the environmental parameter.

In general, the environmental conditioning device 120L decreases the temperature proximate to one or more of the sensors 140a. 140b, . . . , 140M when operating as the AC unit. The environmental conditioning device 120L increases the temperature proximate to one or more of the sensors 140a, 140b, . . . , 140M operating as the heating unit. Further, the environmental conditioning device 120L adjusts the humidity proximate to one or more of the sensors 140a, 140b, . . . , 140M when operating as the humidifier. The environmental conditioning device 120L adjusts the gas concentration proximate to one or more of the sensors 140a, 140b, . . . , 140M when operating as the gas supply. Further, the environmental conditioning device 120L adjusts a wind speed and/or direction proximate to one or more of the sensors 140a, 140b, . . . , 140M when operating as the fan. In this way, the environmental conditioning device 120L conditions the environment proximate to one or more of the sensors 140a, 140b, . . . , 140M by adjusting the environmental parameter.

In some embodiments, the environmental conditioning devices 120a, 120b, . . . , 120L condition the environment proximate to one or more of the grow lights 110a, 110b, . . . , 110N. For example, the environmental conditioning device 120a decreases the temperature proximate to one or more of the grow lights 110a. 110b, . . . , 110N when operating as the AC unit. The environmental conditioning device 120a increases the temperature proximate to one or more of the grow lights 110a, 110b, . . . , 110N operating as the heating unit. Further, the environmental conditioning device 120a adjusts the humidity proximate to one or more of the grow lights 110a, 110b, . . . , 110N when operating as the humidifier. The environmental conditioning device 120a adjusts the gas concentration proximate to one or more of the grow lights 110a, 110b, . . . , 110N when operating as the gas supply. Further, the environmental conditioning device 120a adjusts a wind speed and/or direction proximate to one or more of the grow lights 110a, 110b, . . . , 110N when operating as the fan. In this way, the environmental conditioning device 120a conditions the environment proximate to one or more of the grow lights 110a, 110b, . . . , 110N by adjusting the environmental parameter.

Further, the environmental conditioning device 120b decreases the temperature proximate to one or more of the grow lights 110a, 110b, . . . , 110N when operating as the AC unit. The environmental conditioning device 120b increases the temperature proximate to one or more of the grow lights 110a, 110b, . . . , 110N operating as the heating unit. Further, the environmental conditioning device 120b adjusts the humidity proximate to one or more of the grow lights 110a, 110b, . . . , 110N when operating as the humidifier. The environmental conditioning device 120b adjusts the gas concentration proximate to one or more of the grow lights 110a, 110b, . . . , 1100N when operating as the gas supply. Further, the environmental conditioning device 120b adjusts a wind speed and/or direction proximate to one or more of the grow lights 110a, 110b, . . . , 110N when operating as the fan. In this way, the environmental conditioning device 120b conditions the environment proximate to one or more of the grow lights 110a, 110b, . . . , 110N by adjusting the environmental parameter.

In general, the environmental conditioning device 120L decreases the temperature proximate to one or more of the grow lights 110a, 110b . . . , 110N when operating as the AC unit. The environmental conditioning device 120L increases the temperature proximate to one or more of the grow lights 110a, 110b, . . . , 110N operating as the heating unit. Further, the environmental conditioning device 120L adjusts the humidity proximate to one or more of the grow lights 110a, 110b, . . . , 110N when operating as the humidifier. The environmental conditioning device 120L adjusts the gas concentration proximate to one or more of the grow lights 110a, 110b, . . . , 110N when operating as the gas supply. Further, the environmental conditioning device 120L adjusts a wind speed and/or direction proximate to one or more of the grow lights 110a, 110b, . . . , 110N when operating as the fan. In this way, the environmental conditioning device 120L conditions the environment proximate to one or more of the grow lights 110a, 110b, . . . , 110N by adjusting the environmental parameter. It should be noted that the environmental conditioning devices 120a, 120b, . . . , 120L can condition the environment proximate to any combination of the environmental conditioning devices 120a, 120b, . . . , 120L, sensors 140a, 140b, . . . , 140M, and grow lights 110a, 110b, . . . , 110N.

In this embodiment, the environmental conditioning devices of the environmental conditioning array 120 are operatively coupled to the computer 101 so that a corresponding environmental control signal flows therebetween. For example, the environmental conditioning device 120a is operatively coupled to the computer 101 so that an environmental conditioning device signal $S_{EnvCond1}$ can flow therebetween. The environmental conditioning device 120b is operatively coupled to the computer 101 so that an environmental conditioning device signal $S_{EnvCond2}$ can flow therebetween. In general, the environmental conditioning device 120L is operatively coupled to the computer 101 so that an environmental conditioning device signal $S_{EnvCondL}$ can flow therebetween. It should be noted that the environmental conditioning device signals $S_{EnvCond1}$, $S_{EnvCond2}$, . . . , $S_{EnvCondL}$ are included with the environmental conditioning array signal $S_{EnvCond}$ of FIGS. 1a and 1b. The environmental conditioning device signals $S_{EnvCond1}$, $S_{EnvCond2}$, . . . , $S_{EnvCondL}$ can be of many different types, such as the digital and/or analog environmental control signal. The environmental conditioning device signals $S_{EnvCond1}$, $S_{EnvCond2}$, . . . , $S_{EnvCondL}$ can be included with the digital and analog data mentioned above, wherein the digital and analog data are processed by the computer 101.

The environmental conditioning device signals $S_{EnvCond1}$, $S_{EnvCond2}$, . . . , $S_{EnvCondL}$ include information that controls the operation of the corresponding environmental conditioning devices 120a, 120b, . . . , 120L. For example, in one situation, the environmental conditioning device 120a conditions the environment proximate to it in response to receiving the environmental conditioning device signal $S_{EnvCond1}$. In another situation, the environmental conditioning device 120a conditions the environment proximate to one or more of the sensors 140a, 140b, . . . , 140M in response to receiving the environmental conditioning device signal $S_{EnvCond1}$. In another situation, the environmental conditioning device 120a conditions the environment proximate to one or more of the grow lights 110a, 110b, . . . , 110M in response to receiving the environmental conditioning device signal $S_{EnvCond1}$. It should be noted that the environmental conditioning device 120a can condition the environment proximate to any combination of the sensors 140a, 140b, . . . , 140M, environmental conditioning devices 120a, 120b, . . . , 120L, and grow lights 110a, 110b, . . . , 110N in response to receiving the environmental conditioning device signal $S_{EnvCond1}$.

Further, the environmental conditioning device 120b conditions the environment proximate to it in response to receiving the environmental conditioning device signal $S_{EnvCond2}$ in another situation, the environmental conditioning device 120b conditions the environment proximate to one or more of the sensors 140a, 140b, . . . , 140M in response to receiving the environmental conditioning device signal $S_{EnvCond2}$. In another situation, the environmental conditioning device 120b conditions the environment proximate to one or more of the grow lights 110a, 110b, . . . , 110M in response to receiving the environmental conditioning device signal $S_{EnvCond2}$. It should be noted that the environmental conditioning device 120b can condition the environment proximate to any combination of the sensors 140a, 140b, . . . , 140M, environmental conditioning devices 120a, 120b, . . . , 120L, and grow lights 110a, 110b, . . . , 110N in response to receiving the environmental conditioning device signal $S_{EnvCond2}$.

In general, the environmental conditioning device 120L conditions the environment proximate to it in response to receiving the environmental conditioning device signal $S_{EnvCondL}$. In another situation, the environmental conditioning device 120L conditions the environment proximate to one or more of the sensors 140a, 140b, . . . , 140M in response to receiving the environmental conditioning device signal $S_{EnvCondL}$. In another situation, the environmental conditioning device 120L conditions the environment proximate to one or more of the grow lights 110a, 110b, . . . , 110M in response to receiving the environmental conditioning device signal $S_{EnvCondL}$. It should be noted that the environmental conditioning device 120L can condition the environment proximate to any combination of the sensors 140a. 140b, . . . , 140M, environmental conditioning devices 120a, 120b, . . . , 120L, and grow lights 110a, 110b, . . . , 110N in response to receiving the environmental conditioning device signal $S_{EnvCondL}$.

In some situations, the environmental conditioning device 120a has an ON condition in response to receiving the environmental conditioning device signal $S_{EnvCond1}$. In other situations, the environmental conditioning device 120a has an OFF condition in response to receiving the environmental conditioning device signal $S_{EnvCond1}$. In general, the environmental conditioning device 120a is repeatably moveable between the ON and OFF conditions in response to receiving the environmental conditioning device signal $S_{EnvCond1}$.

Further, the environmental conditioning device 120b has an ON condition in response to receiving the environmental conditioning device signal $S_{EnvCond2}$. In other situations, the environmental conditioning device 120b has an OFF condition in response to receiving the environmental conditioning device signal $S_{EnvCond2}$. In general, the environmental conditioning device 120b is repeatably moveable between the ON and OFF conditions in response to receiving the environmental conditioning device signal $S_{EnvCond2}$.

In general, the environmental conditioning device 120L has an ON condition in response to receiving the environmental conditioning device signal $S_{EnvCondL}$. In other situations, the environmental conditioning device 120L has an OFF condition in response to receiving the environmental conditioning device signal $S_{EnvCondL}$. In general, the environmental conditioning device 120L is repeatably moveable between the ON and OFF conditions in response to receiving the environmental conditioning device signal $S_{EnvCondL}$.

In some embodiments, one or more of the environmental conditioning device signals $S_{EnvCond1}$, $S_{EnvCond2}$, . . . , $S_{EnvCondL}$ include a corresponding environmental control position signal, which includes information that corresponds to the position of the respective environmental conditioning devices 120a, 120b, . . . , 120L. For example, the environmental conditioning device 120a can provide a first environmental conditioning position coordinate corresponding to a first environmental conditioning position of the environmental conditioning device 120a. The environmental conditioning device 120a can provide a second environmental conditioning position coordinate corresponding to a second environmental conditioning position of the environmental conditioning device 120a, wherein the first and second environmental conditioning positions of the environmental conditioning device 120a are different. The first environmental conditioning position coordinate is driven to match the second environmental conditioning position coordinate in response to moving the environmental conditioning device 120a from the first environmental conditioning position to the second environmental conditioning position. The second environmental conditioning position coordinate is driven to match the first environmental conditioning position coordinate in response to moving the environmental conditioning device 120a from the second environmental conditioning position to the first environmental conditioning position. It should be noted that the environmental conditioning device 120a is repeatably moveable between the first and second environmental conditioning positions.

The environmental conditioning device 120b can provide a third environmental conditioning position coordinate corresponding to a first position of the environmental conditioning device 120b. The environmental conditioning device 120b can provide a fourth environmental conditioning position coordinate corresponding to a second position of the environmental conditioning device 120b, wherein the third and fourth positions of the environmental conditioning device 120b are different. The third environmental conditioning position coordinate is driven to match the fourth environmental conditioning position coordinate in response to moving the environmental conditioning device 120b from the third position to the fourth position. The fourth environmental conditioning position coordinate is driven to match the third environmental conditioning position coordinate in response to moving the environmental conditioning device 120b from the fourth position to the third position. It should be noted that the environmental conditioning device 120b is repeatably moveable between the third and fourth environmental conditioning positions. In general, the environmental conditioning device 120L can provide an $L^{th}$ environmental conditioning position coordinate corresponding to the $L^{th}$ position of the environmental conditioning device 120L, wherein the environmental conditioning device 120L is repeatably moveable between the L environmental conditioning positions.

The environmental conditioning position coordinates can correspond to many different types of coordinates, such as the longitude and latitude. In some embodiments, the environmental conditioning position coordinates correspond to the coordinates determined by the Global Positioning System. In other embodiments, the environmental conditioning position coordinates correspond to the coordinates relative to an arbitrary location. The arbitrary location can correspond to many different types of locations. In one situation, the arbitrary location corresponds to the location of a corner of a grow bed. In another situation, the arbitrary location corresponds to the location of a corner of a green house. In general, the arbitrary location is chosen by the user to be a convenient location with which to determine the environmental conditioning position coordinates. The environmental conditioning position coordinates can be provided in many different ways, such as by including the environmental conditioning positioning chip with each of the environmental conditioning devices 120a, 120b, . . . , 120L. Hence, the environmental conditioning array 120 can include one or more positioning chips.

Figure 1C:
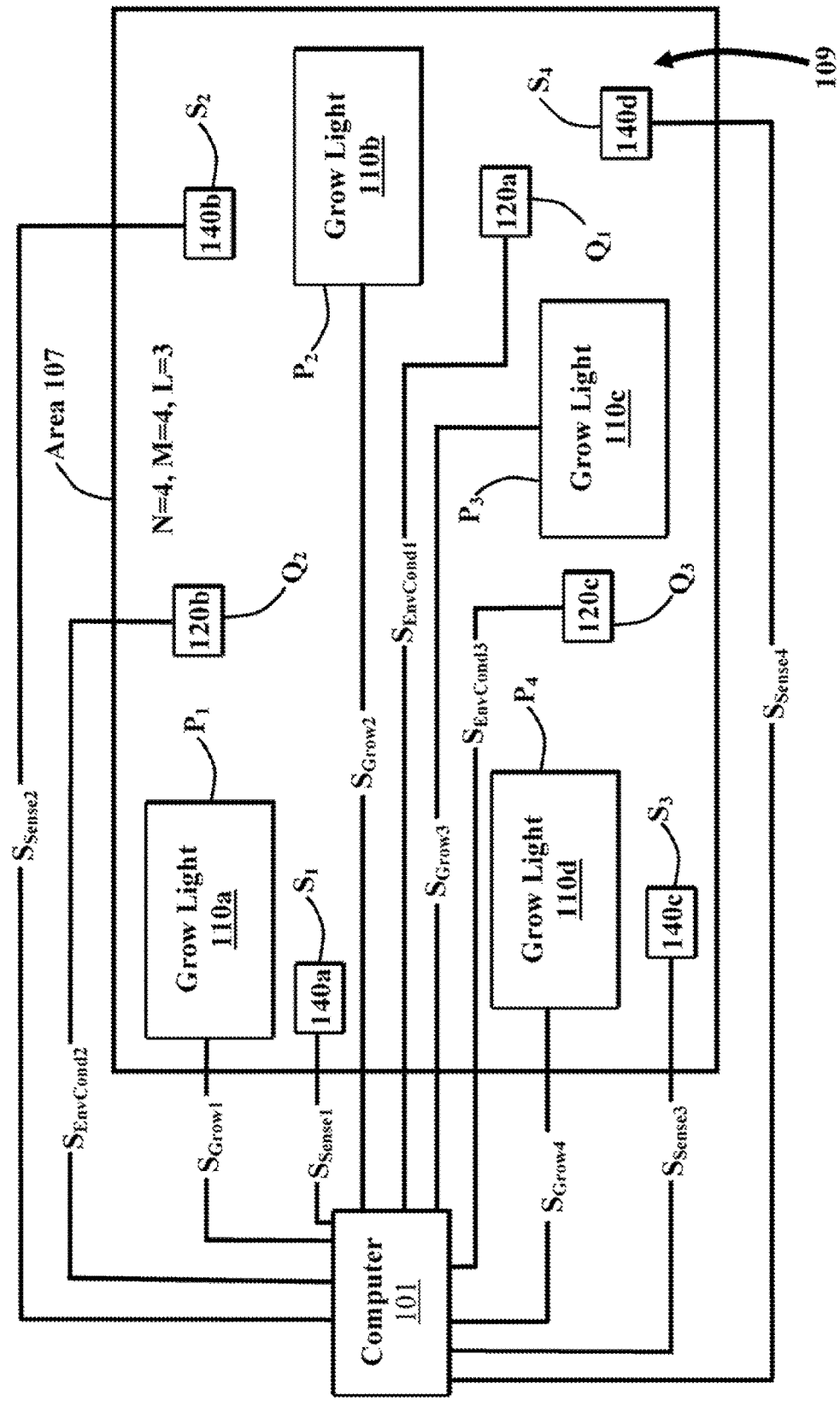
FIG. 1c is a diagram of the lighting system of FIG. 1a positioned proximate to an area, wherein it is desirable to light, sense, and condition the area.

FIG. 1c is a diagram of the lighting system 100 of FIG. 1a positioned proximate to an area 107, wherein it is desirable to illuminate, sense, and condition the area 107. The area 107 can correspond to many different types of areas, such as those associated with a building. The building can be of many different types, such as a grow house and greenhouse. An example of a grow house is a building in which one or more plants are grown inside the building using artificial light, such as light from halogen lamps and/or LEDs. An example of a greenhouse is a building in which one or more plants are grown using at least some natural light. Some greenhouses utilize natural light and artificial light. Examples of greenhouses are provided in U.S. Pat. Nos. 8,915,015, 8,578,650, and 7,228,657, the contents of all of which are incorporated herein by reference in their entirety.

Sensor Array:

As mentioned above, the lighting system 100 includes the sensor array 140 operatively coupled to the computer 101. In this embodiment, the sensor array 140 includes four sensors 140a. 140b, 140c, and 140d, so that M is equal to four (M=4). In this way, sensor array 140 includes four sensors. The sensors 140a, 140b, 140c, and 140d can have many different positions proximate to the area 107, wherein the positions proximate to the area 107 correspond to the sensor location parameter. In this embodiment, the computer 101 determines the sensor location parameter of each sensor of the sensor array 140.

As shown in FIG. 1c, the location parameters for sensors 140a, 140b. 140c, and 140d are the first, second, third, and fourth location parameters $S_1$, $S_2$, $S_3$, and $S_4$, respectively. Information regarding the location parameters, and determining the location parameters, is provided in U.S. patent application Ser. No. 15/004,320 and U.S. Provisional Application No. 62/303,374.

It should be noted that the user generally determines the first, second, third, and fourth location parameters $S_1$, $S_2$, $S_3$, and $S_4$. It should also be noted that the first, second, third, and fourth location parameters $S_1$, $S_2$, $S_3$ and $S_4$ are adjustable. For example, the first location parameter $S_1$ is adjustable in response to moving sensor 140a. The second location parameter $S_2$ is adjustable in response to moving sensor 140b. The third location parameter $S_3$ is adjustable in response to moving sensor 140c. The fourth location parameter $S_4$ is adjustable in response to moving sensor 140d. As will be discussed in more detail below, the first, second, third, and fourth location parameters $S_1$, $S_2$, $S_3$, and $S_4$ are adjustable to adjust a light map of the area 107.

In one embodiment of the lighting system 100, the computer 101 determines the sensor location parameter of the sensors of the sensor array 140. For example, in one situation, the computer 101 determines the first sensor location parameter $S_1$ of the sensor 140a, wherein the first sensor location parameter $S_1$ is provided to the computer 101 with the first communication signal $S_{Sense1}$. In another situation, the computer 101 determines the second sensor location parameter $S_2$ of the sensor 140b, wherein the second sensor location parameter $S_2$ is provided to the computer 101 with the second communication signal $S_{Sense2}$. In another situation, the computer 101 determines the third sensor location parameter $S_3$ of the sensor 140c, wherein the third sensor location parameter $S_3$ is provided to the computer 101 with the third communication signal $S_{Sense3}$. In another situation, the computer 101 determines the fourth sensor location parameter $S_4$ of the sensor 140d, wherein the fourth sensor location parameter $S_4$ is provided to the computer 101 with the fourth communication signal $S_{Sense4}$. In general, the computer determines the $M^{th}$ sensor location parameter $S_M$ of the sensor array 140M, wherein the $M^{th}$ sensor location parameter $S_M$ is provided to the computer with the $M^{th}$ signal $S_{SenseM}$.

In another embodiment of the lighting system 100, the computer 101 determines the sensor location parameter of at least one of the sensors of the sensor array 105. For example, in one situation, the computer 101 determines the first and third sensor location parameters $S_1$ and $S_3$ of the sensors 140a and 140c, wherein the first and third sensor location parameters $S_1$ and $S_3$ are provided to the computer 101 with the first and third communication signals $S_{Sense1}$ and $S_{Sense3}$, respectively. In another situation, the computer 101 determines the second and fourth sensor location parameters $S_2$ and $S_4$ of the sensors 140b and 140d, wherein the second and fourth sensor location parameters $S_2$ and $S_4$ are provided to the computer 101 with the second and fourth communication signals $S_{Sense2}$ and $S_{Sense4}$, respectively. In another situation, the computer 101 determines the first and fourth sensor location parameters $S_1$ and $S_4$ of the sensors 140a and 140d, wherein the first and fourth sensor location parameters $S_1$ and $S_4$ are provided to the computer 101 with the first and fourth communication signals $S_{Sense1}$ and $S_{Sense4}$, respectively. In another situation, the computer 101 determines the second and third sensor location parameters $S_2$ and $S_3$ of the sensors 140b and 140c, wherein the second and third sensor location parameters $S_2$ and $S_3$ are provided to the computer 101 with the second and third communication signals $S_{Sense2}$ and $S_{Sense3}$, respectively. In general, the computer 101 determines at least one of the $M^{th}$ sensor location parameters of at least one of the sensors 140a, 140b, . . . , 140M, wherein the $M^{th}$ sensor location parameters are provided to the computer 101 with the corresponding $M^{th}$ sensor signal $S_{SenseM}$.

In this embodiment, the lighting system 100 includes the computer 101, and the grow light array 110 operatively in communication with the computer 101. In this embodiment, the lighting system 100 includes grow lights 110a, 110b, 110c, and 110d, so that N is equal to four (N=4). The grow lights 110a, 110b, 110c, and 110d can have many different positions proximate to the area 107, wherein the positions proximate to the area 107 correspond to the grow light location parameter. In this embodiment, the computer 101 determines the grow light location parameter of each grow light of the grow light array 110.

As shown in FIG. 1c, the location parameters for grow lights 110a, 110b, 110c, and 110d are the first, second, third, and fourth grow light location parameters $P_1$, $P_2$, $P_3$, and $P_4$, respectively. Information regarding the grow light location parameter, and determining the grow light location parameter, is provided in U.S. patent application Ser. No. 15/004, 320 and U.S. Provisional Application No. 62/303,374.

It should be noted that the user generally determines the first, second, third, and fourth grow light location parameters $P_1$, $P_2$, $P_3$, and $P_4$. It should also be noted that the first, second, third, and fourth grow light location parameters $P_1$, $P_2$, $P_3$, and $P_4$ are adjustable. For example, the first grow light location parameter $P_1$ is adjustable in response to moving grow light 110a. The second grow light location parameter $P_2$ is adjustable in response to moving grow light 110b. The third grow light location parameter $P_3$ is adjustable in response to moving grow light 110c. The fourth grow light location parameter $P_4$ is adjustable in response to moving grow light 110d. As will be discussed in more detail below, the first, second, third, and fourth grow light location parameters $P_1$, $P_2$, $P_3$, and $P_4$ are adjustable to adjust a light map of the area 107.

It should be noted that, in some embodiments, the computer 101 determines a difference between the grow light location parameters. For example, the computer 101 can determine a first difference between the first and second grow light location parameters $P_1$ and $P_2$. The computer 101 can determine a second difference between the first and third grow light location parameters $P_1$ and $P_3$. The computer 101 can determine a third difference between the first and fourth grow light location parameters $P_1$ and $P_4$. The computer 101 can determine a fourth difference between the second and third grow light location parameters $P_2$ and $P_3$. The computer 101 can determine a fifth difference between the second and fourth grow light location parameters $P_2$ and $P_4$. Further, the computer 101 can determine a sixth difference between the third and fourth grow light location parameters $P_3$ and $P_4$.

It should also be noted that the computer 101 can determine a difference between a plurality of grow light location parameters. For example, the computer 101 can determine a difference between a plurality of grow light location parameters. For example, the computer 101 can determine the first difference and second difference. The computer 101 can determine the first difference and the third difference. It should be appreciated that the computer 101 can determine any combination of the first, second, third, fourth, fifth, and sixth differences.

Further, the computer 101 can determine the relative values of the differences. For example, the computer 101 can determine if the first difference is greater than the second difference. The computer 101 can determine if the first difference is less than the second difference. Further, the computer 101 can determine if the first difference is equal to the second difference. The computer 101 can determine if the first difference is substantially equal to the second difference. It should be appreciated that the computer 101 can determine any combination of the relative values of the first, second, third, fourth, fifth, and sixth differences.

In one embodiment of the lighting system 100, the computer 101 determines the grow light location parameter of the grow lights of the grow light array 110. For example, in one situation, the computer 101 determines the first grow light location parameter $P_1$ of the grow light 110a, wherein the first grow light location parameter $P_1$ is provided to the computer 101 with the first communication signal $S_{Grow1}$. In another situation, the computer 101 determines the second grow light location parameter $P_2$ of the grow light 110b, wherein the second grow light location parameter $P_2$ is provided to the computer 101 with the second communication signal $S_{Grow2}$. In another situation, the computer 101 determines the third grow light location parameter $P_3$ of the grow light 110c, wherein the third grow light location parameter $P_3$ is provided to the computer 101 with the third communication signal $S_{Grow3}$. In another situation, the computer 101 determines the fourth grow light location parameter $P_4$ of the grow light 110d, wherein the fourth grow light location parameter $P_4$ is provided to the computer 101 with the fourth communication signal $S_{Grow4}$. In general, the computer determines the $N^{th}$ grow light location parameter $P_N$ of the lighting system 110N, wherein the $N^{th}$ grow light location parameter $P_N$ is provided to the computer with the $N^{th}$ signal $S_{GrowN}$.

In another embodiment of the lighting system 100, the computer 101 determines the grow light location parameter of at least one of the grow lights of the grow light array 110.

For example, in one situation, the computer 101 determines the first and third grow light location parameters $P_1$ and $P_3$ of the grow light 110a and 110c, wherein the first and third grow light location parameters $P_1$ and $P_3$ are provided to the computer 101 with the first and third communication signals $S_{Grow1}$ and $S_{Grow3}$, respectively. In another situation, the computer 101 determines the second and fourth grow light location parameters $P_2$ and $P_4$ of the grow lights 110b and 110d, wherein the second and fourth grow light location parameters $P_2$ and $P_4$ are provided to the computer 101 with the second and fourth communication signals $S_{Grow2}$ and $S_{Grow4}$, respectively. In another situation, the computer 101 determines the first and fourth grow light location parameters $P_1$ and $P_4$ of the grow lights 110a and 110d, wherein the first and fourth grow light location parameters $P_1$ and $P_4$ are provided to the computer 101 with the first and fourth communication signals $S_{Grow1}$ and $S_{Grow4}$, respectively. In another situation, the computer 101 determines the second and third grow light location parameters $P_2$ and $P_3$ of the grow lights 110b and 110c, wherein the second and third grow light location parameters $P_2$ and $P_3$ are provided to the computer 101 with the second and third communication signals $S_{Grow2}$ and $S_{Grow3}$, respectively. In general, the computer 101 determines at least one of the $N^{th}$ grow light location parameters of at least one of the grow lights 110a. 110b, . . . , 110N, wherein the $N^{th}$ grow light location parameters are provided to the computer 101 with the corresponding $N^{th}$ grow light signal $S_{GrowN}$.

In this embodiment, the lighting system 100 includes the computer 101, and the environmental conditioning device array 120 operatively in communication with the computer 101. In this embodiment, the environmental conditioning device array 120 includes environmental conditioning devices 120a, 120b, and 120c, so that L is equal to three (L=3). The environmental conditioning devices 120a, 120b, and 120c can have many different positions proximate to the area 107, wherein the positions proximate to the area 107 correspond to the environmental conditioning device location parameter. In this embodiment, the computer 101 determines the environmental conditioning device parameter of each environmental conditioning device of the environmental conditioning device array 120. As shown in FIG. 1c, the location parameters for the environmental conditioning devices 120a, 120b, and 120c are the first, second, and third environmental conditioning device location parameters $Q_1$, $Q_2$, and $Q_3$, respectively. Information regarding the environmental conditioning device location parameter, and determining the environmental conditioning device location parameter, is provided in U.S. patent application Ser. No. 15/004,320 and U.S. Provisional Application No. 62/303,374.

It should be noted that the user generally determines the first, second, and third environmental conditioning device location parameters $Q_1$, $Q_2$ and $Q_3$. It should also be noted that the first second, and third environmental conditioning device location parameters $Q_1$, $Q_2$, and $Q_3$ are adjustable. For example, the first environmental conditioning device location parameter $Q_1$ is adjustable in response to moving the environmental conditioning device 120a. The second environmental conditioning device location parameter $Q_2$ is adjustable in response to moving the environmental conditioning device 120b. The third environmental conditioning device location parameter $Q_3$ is adjustable in response to moving the environmental conditioning device 120c. As will be discussed in more detail below, the first, second, and third environmental conditioning device location parameters $Q_1$, $Q_2$, and $Q_3$ are adjustable to adjust an environmental conditioning map of the area 107.

In one embodiment of the lighting system 100, the computer 101 determines the environmental conditioning device location parameter of the environmental conditioning devices of the environmental conditioning device array 120. For example, in one situation, the computer 101 determines the first environmental conditioning device location parameter $Q_1$ of the environmental conditioning device 120*a*, wherein the first environmental conditioning device location parameter $Q_1$, is provided to the computer 101 with the first environmental conditioning signal $S_{EnvCond1}$. In another situation, the computer 101 determines the second environmental conditioning location parameter $Q_2$ of the environmental conditioning device 120*b*, wherein the second environmental conditioning location parameter $Q_2$ is provided to the computer 101 with the second environmental conditioning signal $S_{EnvCond2}$. In another situation, the computer 101 determines the third environmental conditioning location parameter $Q_1$ of the environmental conditioning 120*c*, wherein the third environmental conditioning location parameter $Q_1$ is provided to the computer 101 with the third environmental conditioning signal $S_{EnvCond3}$. In general, the computer determines the $L^{th}$ environmental conditioning location parameter $Q_L$ of the lighting system 120L, wherein the $L^{th}$ environmental conditioning location parameter $Q_L$ is provided to the computer with the $L^{th}$ environmental conditioning signal $S_{EnvCondL}$.

In another embodiment of the lighting system 100, the computer 101 determines the environmental conditioning location parameter of at least one of the environmental conditioning devices of the environmental conditioning device array 120. For example, in one situation, the computer 101 determines the first and third environmental conditioning location parameters $Q_1$ and $Q_3$ of the environmental conditioning devices 120*a* and 120*c*, wherein the first and third environmental conditioning location parameters $Q_1$ and $Q_3$ are provided to the computer 101 with the first and third environmental conditioning signals $S_{EnvCond1}$ and $S_{EnvCond3}$, respectively. In another situation, the computer 101 determines the second and third environmental conditioning location parameters $Q_2$ and $Q_3$ of the environmental conditioning devices 120*b* and 120*c*, wherein the second and third environmental conditioning location parameters $Q_2$ and $Q_3$ are provided to the computer 101 with the second and third environmental conditioning signals $S_{EnvCond2}$ and $S_{EnvCond3}$, respectively. In another situation, the computer 101 determines the first, second, and third environmental conditioning location parameters $Q_1$, $Q_2$, and $Q_3$ of the environmental conditioning devices 120*a*, 120*b*, and 120*c*, wherein the first, second, and third environmental conditioning location parameters $Q_1$, $Q_2$, and $Q_3$ are provided to the computer 101 with the first, second, and third environmental conditioning signals $S_{EnvCond1}$, $S_{EnvCond2}$, and $S_{EnvCond3}$, respectively. In general, the computer 101 determines at least one of the $L^{th}$ environmental conditioning location parameters of at least one of the environmental conditioning devices 120*a*, 120*b*, ..., 120L, wherein the $L^{th}$ environmental conditioning location parameters are provided to the computer 101 with the corresponding $L^{th}$ environmental conditioning signal $S_{EnvCondL}$.

FIG. 2*a* is a view of a first digital light spectrum map 103*a* displayed by a display device 102 of the computer 101 of FIG. 1*c*, wherein the first digital light spectrum map 103*a* corresponds to a first light spectrum map of the area 107 of FIG. 1*c* at a time $t_1$. The display device 102 can be of many different types, such as one typically included with a computer to display an image. The display device 102 can also be one typically used with a mobile electronic device, such as a mobile phone and personal digital assistant. An example of a mobile phone is an IPHONE and an example of a personal digital assistant is an IPAD.

In this embodiment, the first digital temperature map 103*a* corresponds to the light spectrum parameter, wherein the light spectrum parameter is discussed in more detail above. The first digital light spectrum map 103*a* can correspond to the light spectrum parameter in many different ways. In one embodiment, the first digital light spectrum map 103*a* corresponds to at least one light spectrum parameter of the area 107 at the time $t_1$, wherein the light spectrum parameter corresponds to the light spectrum value proximate to the locations of the sensors. As discussed in more detail above, the light spectrum values proximate to the sensors are adjustable in response to adjusting the operation of the grow light array. In one particular example, the first digital light spectrum map 103*a* corresponds to the light spectrum parameters proximate to the location parameters $P_1$, $P_2$, $P_3$, and $P_4$ at the time $t_1$. Further, the first digital light spectrum map 103*a* corresponds to the light spectrum values proximate to the location parameters $S_1$, $S_2$, $S_3$, and $S_4$ at the time $t_1$.

The computer 101 can provide the digital light spectrum map 103*a* in many different ways, such as those discussed in more detail above. For example, the first digital light spectrum map 103*a* can be displayed by the display device 102 in response to the computer 101 receiving the sense signal $S_{Sense}$ at the time $t_1$ wherein the sense signal $S_{Sense}$ is provided by the sensor array 140. The first digital light spectrum map 103*a* can be displayed by the display device 102 in response to the computer receiving at least one of the sense signals $S_{Sense1}$, $S_{Sense2}$, ..., $S_{SenseM}$ at the time $t_1$. As discussed above, the sense signals $S_{Sense1}$, $S_{Sense2}$, ..., $S_{SenseM}$ are provided by the corresponding sensors 140*a*, 140*b*, ..., 140M of the sensor array 140. In this particular example, first digital light spectrum map 103*a* is displayed by the display device 102 in response to the computer receiving at least one of the sense signals $S_{Sense1}$, $S_{Sense2}$, $S_{Sense3}$, and $S_{Sense4}$ at the time $t_1$. As discussed above, the sense signals $S_{Sense1}$, $S_{Sense2}$, $S_{Sense3}$, and $S_{Sense4}$ are provided by the corresponding sensors 140*a*, 140*b*, 140*c*, and 140*d* of the sensor array 140. In this way, the computer 101 provides the first digital light spectrum map 103*a* at the time $t_1$.

It should be noted that the first digital light spectrum map 103*a* can be provided by the computer 101 in response to processing the data of the sense signals $S_{Sense1}$, $S_{Sense2}$, $S_{Sense3}$, ..., $S_{SenseM}$. The data of the sense signals $S_{Sense1}$, $S_{Sense2}$, $S_{Sense3}$, ..., $S_{SenseM}$ can be processed in many different ways, such as by applying a curve fit thereto. In FIG. 2.*a* the data of the sense signals sense signals $S_{Sense1}$, $S_{Sense2}$, $S_{Sense3}$, ..., $S_{SenseM}$ is represented by the display device 102 as one or more colors. In this particular example, the colors are green, blue, and red. However, it should be noted that other colors can be used, and the colors green, blue, and red are used for illustrative purposes. The colors green, blue, and red represent a first color spectrum $CS_1$, second color spectrum $CS_2$, and third color spectrum $CS_3$, respectively.

In this embodiment, the first color spectrum $CS_1$ includes wavelengths less than the second color spectrum $CS_2$, and the first color spectrum $CS_1$ includes wavelengths greater than the third color spectrum $CS_3$. In some embodiments, the first color spectrum $CS_1$ consists of wavelengths less than the second color spectrum $CS_2$, and the first color spectrum $CS_1$ consists of wavelengths greater than the third color spectrum $CS_3$. Further, in some embodiments, the first color spectrum $CS_1$ consists essentially of wavelengths less than the second color spectrum $CS_2$, and the first color spectrum $CS_1$ consists essentially of wavelengths greater than the third color spectrum $CS_3$.

In this embodiment, the second color spectrum $CS_2$ includes wavelengths less than the first color spectrum $CS_1$, and includes wavelengths less than the third color spectrum $CS_3$. In some embodiments, the second color spectrum $CS_2$ consists of wavelengths less than the first color spectrum $CS_1$, and the second color spectrum $CS_2$ consists of wavelengths less than the third color spectrum $CS_3$. Further, in some embodiments, the second color spectrum $CS_2$ consists essentially of wavelengths less than the first color spectrum $CS_1$, and the second color spectrum $CS_2$ consists essentially of wavelengths less than the third color spectrum $CS_3$.

In this embodiment, the third color spectrum $CS_3$ includes wavelengths greater than the first color spectrum $CS_1$, and the third color spectrum includes wavelengths greater than the second color spectrum $CS_2$. In some embodiments, the third color spectrum $CS_3$ consists of wavelengths greater than the first color spectrum $CS_1$, and the third color spectrum consists of wavelengths greater than the second color spectrum $CS_2$. Further, in some embodiments, the third color spectrum $CS_3$ consists essentially of wavelengths greater than the first color spectrum $CS_1$, and the third color spectrum consists essentially of wavelengths greater than the second color spectrum $CS_2$.

As will be discussed in more detail presently, the digital light spectrum map 103a can be driven to match a desired digital light spectrum map 103c (FIG. 2c) in response to the operation of the grow light array 110. In particular, the digital light spectrum map 103a can be driven to match the desired digital light spectrum map 103c of the area 107 in response to the operation of the grow light array 110. For illustrative purposes, it is desirable to adjust one or more of the light spectrum parameters to adjust the digital signal light spectrum map 103a proximate to a region 109 of FIG. 2a, as will be discussed with reference to FIGS. 2b and 2c.

Figure 2B:
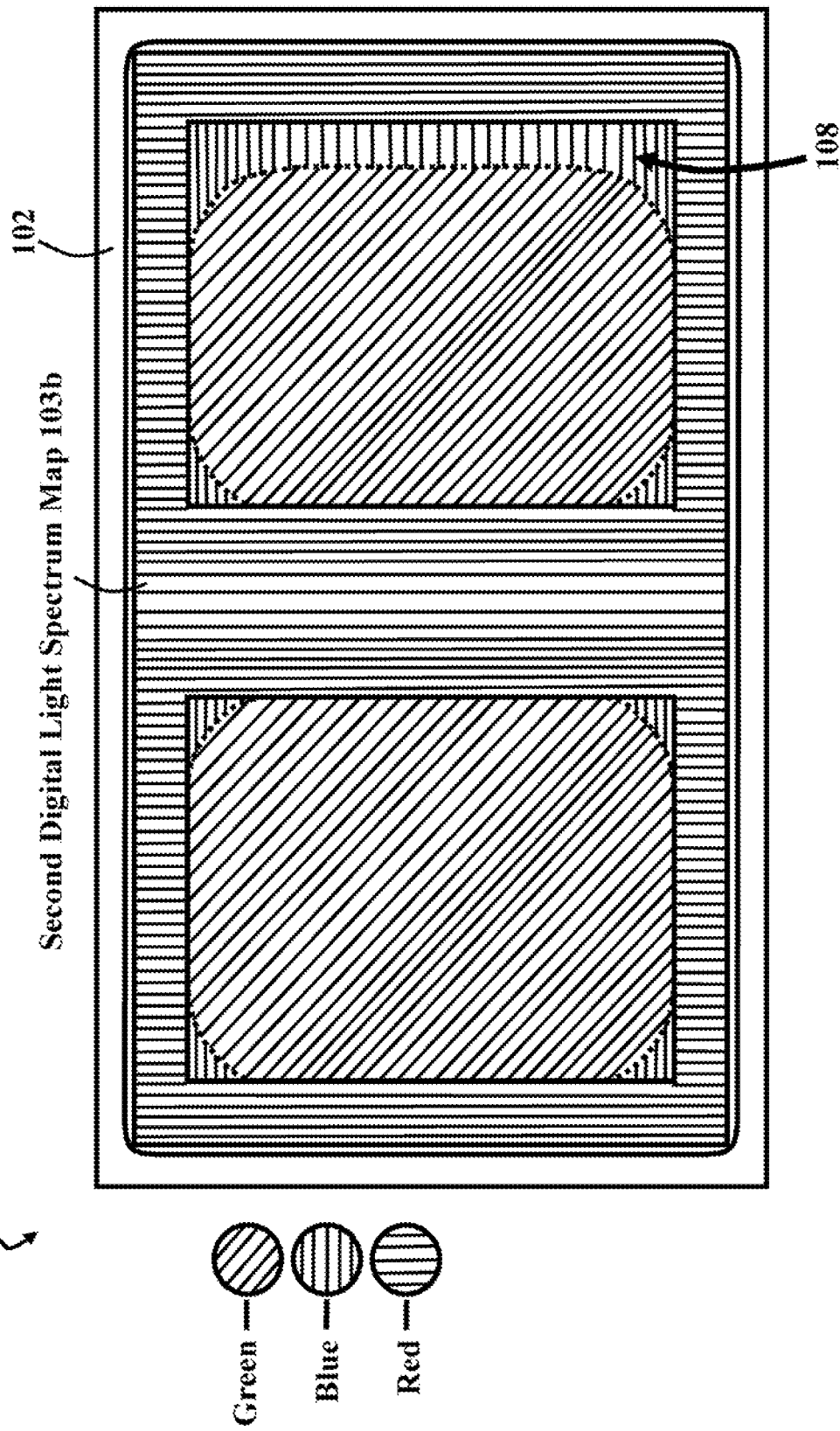
FIG. 2b is a view of a second digital light spectrum map displayed by the computer of FIG. 1a, wherein the second digital light spectrum map corresponds to a light spectrum of the area of FIG. 1c at a time $t_2$.

FIG. 2b is a view of a second digital light spectrum map 103b displayed by the display device 102 of the computer 101 of FIG. 1c, wherein the second digital light spectrum map 103b corresponds to a second light spectrum map of the area 107 of FIG. 1c at a time $t_2$. In this embodiment, the second digital light spectrum map 103b corresponds to the light spectrum parameter, wherein the light spectrum parameter is discussed in more detail above. The second digital light spectrum map 103b can correspond to the light spectrum parameter in many different ways. In one embodiment, the second digital light spectrum map 103b corresponds to at least one light spectrum parameter of the area 107 at the time $t_2$, wherein the light spectrum parameter corresponds to the light spectrum value proximate to the locations of the sensors. In one particular example, the second digital light spectrum map 103b corresponds to the light spectrum parameters proximate to the location parameters $P_1$, $P_2$, $P_3$, and $P_4$ at the time $t_2$. Further, the second digital light spectrum map 103b corresponds to the light spectrum values proximate to the location parameters $S_1$, $S_2$, $S_3$, and $S_4$ at the time $t_2$.

The computer 101 can provide the digital light spectrum map 103b in many different ways, such as those discussed in more detail above. For example, the second digital light spectrum map 103b can be displayed by the display device 102 in response to the computer 101 receiving the sense signal $S_{Sense}$ at the time $t_2$, wherein the sense signal $S_{Sense}$ is provide by the sensor array 140. The second digital light spectrum map 103b can be displayed by the display device 102 in response to the computer receiving at least one of the sense signals $S_{Sense1}$, $S_{Sense2}$, ..., $S_{SenseM}$ at the time $t_2$. As discussed above, the sense signals $S_{Sense1}$, $S_{Sense2}$, ..., $S_{SenseM}$ are provided by the corresponding sensors 140a, 140b, ..., 140M of the sensor array 140. In this particular example, the second digital light spectrum map 103b can be displayed by the display device 102 in response to the computer receiving at least one of the sense signals $S_{Sense1}$, $S_{Sense2}$, $S_{Sense3}$, and $S_{Sense4}$ at the time $t_2$. As discussed above, the sense signals $S_{Sense1}$, $S_{Sense2}$, $S_{Sense3}$, and $S_{Sense4}$ are provided by the corresponding sensors 140a, 140b, 140c, and 140d of the sensor array 140. In this way, the computer 101 provides the second digital light spectrum map 103b at the time $t_2$.

It should be noted that the second digital light spectrum map 103b can be provided by the computer 101 in response to processing the data of the sense signals $S_{Sense1}$, $S_{Sense2}$, $S_{Sense3}$, ..., $S_{SenseM}$. In general, the data of the sense signals $S_{Sense1}$, $S_{Sense2}$, $S_{Sense3}$, ..., $S_{SenseM}$ can be processed in many different ways, such as by applying a curve fit thereto. In FIG. 2b, the data of the sense signals sense signals $S_{Sense1}$, $S_{Sense2}$, $S_{Sense3}$, ..., $S_{SenseM}$ is represented by the display device 102 as one or more colors, which are discussed above with FIG. 2a.

In operation, the second digital light spectrum map 103b is provided in response to the operation of the grow light array 110. In particular, the grow light array 110 conditions the first digital light spectrum map 103a of FIG. 2a to match the second digital light spectrum map 103b of FIG. 2b. The grow light array 110 can condition the first digital light spectrum map 103a to match the second digital light spectrum map 103b in many different ways. In this embodiment, the grow light array drives the sense signals $S_{Sense1}$, $S_{Sense2}$, $S_{Sense3}$, and $S_{Sense4}$ at the time $t_1$ to match the sense signals $S_{Sense1}$, $S_{Sense2}$, $S_{Sense3}$, and $S_{Sense4}$ at the time $t_2$. In general, the grow light array 110 drives the sense signals $S_{Sense1}$, $S_{Sense2}$, $S_{Sense3}$, ..., $S_{Sense4}$ at the time $t_1$ to match the sense signals $S_{Sense1}$, $S_{Sense2}$, $S_{Sense3}$, ..., $S_{SenseM}$ at the time $t_2$. In this way, the first digital light spectrum map 103a is driven to match the second digital light spectrum map 103b of the area 107 in response to the operation of the grow light array 110.

It should be noted that the second digital light spectrum map 103b can be driven to match the desired digital light spectrum map 103c in response to the operation of the grow light array 110. In particular, the second digital light spectrum map 103b can be driven to match the desired digital light spectrum map 103c of the area 107 in response to the operation of the grow light array 110. For illustrative purposes, it is desirable to adjust one or more of the light spectrum parameters to adjust the second digital signal light spectrum map 103b proximate to a region 108 of FIG. 2b, as will be discussed with reference to FIGS. 2b and 2c.

Figure 2C:
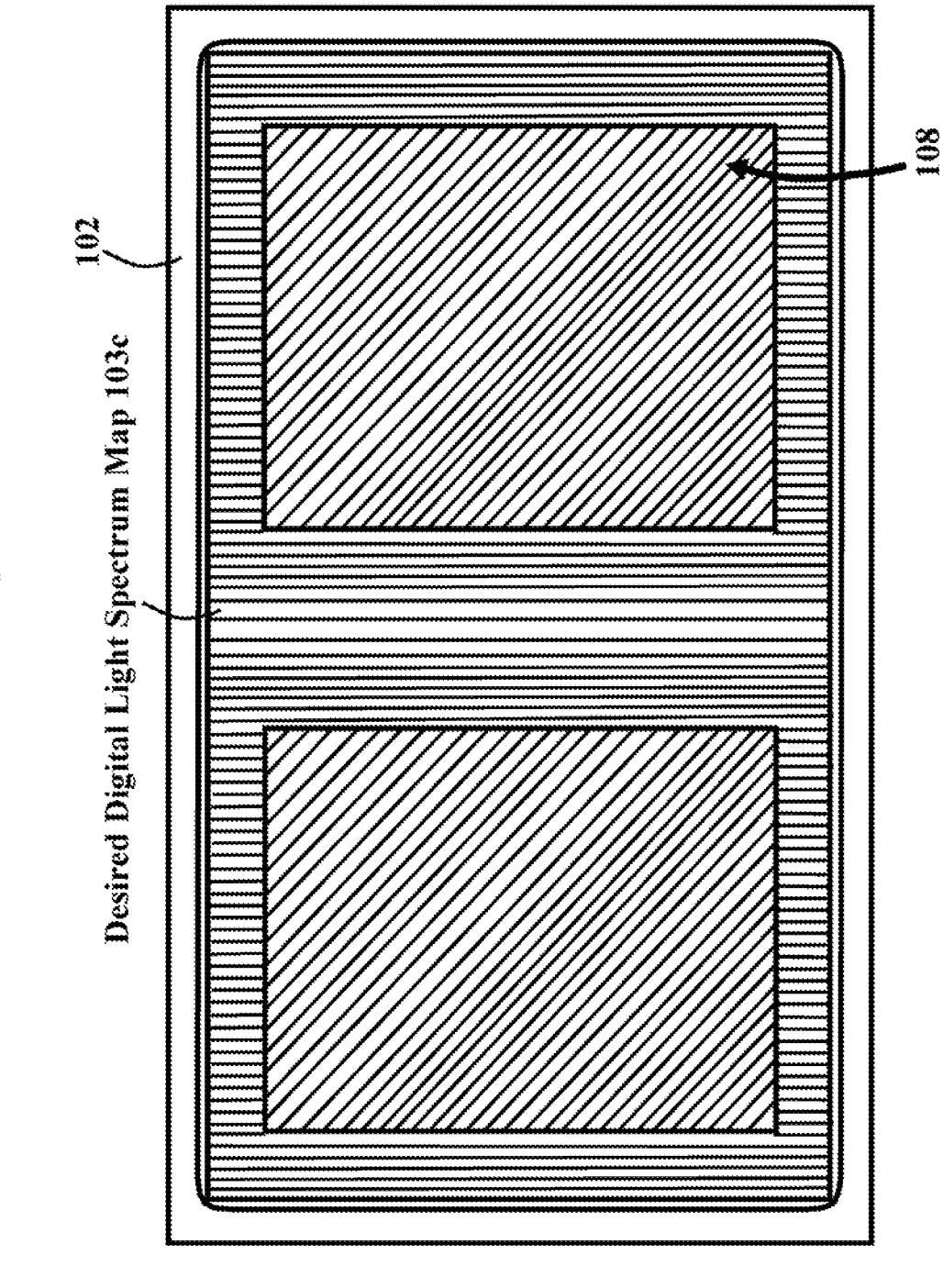
FIG. 2c is a view of a desired digital light spectrum map displayed by the computer of FIG. 1a, wherein the desired digital light spectrum map corresponds to a light spectrum of the area of FIG. 1c at a time $t_3$.
Figure 2C:
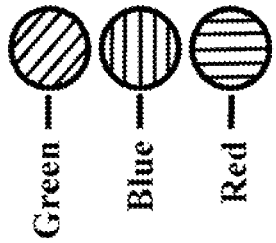

FIG. 2c is a view of a desired digital light spectrum map 103c displayed by the display device 102 of the computer 101 of FIG. 1c, wherein the desired digital light spectrum map 103c corresponds to a third light spectrum map of the area 107 of FIG. 1c at a time $t_3$. In this embodiment, the desired digital light spectrum map 103c corresponds to the light spectrum parameter, wherein the light spectrum parameter is discussed in more detail above. The desired digital light spectrum map 103c can correspond to the light spectrum parameter in many different ways. In one embodiment, the desired digital light spectrum map 103c corresponds to at least one light spectrum parameter of the area 107 at the time $t_3$, wherein the light spectrum parameter corresponds to the light spectrum value proximate to the locations of the sensors. In one particular example, the desired digital light spectrum map 103c corresponds to the light spectrum parameters proximate to the location parameters $P_1$, $P_2$, $P_3$, and $P_4$ at the time $t_1$. Further, the desired digital light spectrum map 103c corresponds to the light spectrum values proximate to the location parameters $S_1$, $S_2$, $S_3$, and $S_4$ at the time $t_3$.

The computer 101 can provide the desired digital light spectrum map 103c in many different ways, such as those discussed in more detail above. For example, the desired digital light spectrum map 103c can be displayed by the display device 102 in response to the computer 101 receiving the sense signal $S_{Sense}$ at the time $t_3$, wherein the sense signal $S_{Sense}$ is provide by the sensor array 140. The desired digital light spectrum map 103c can be displayed by the display device 102 in response to the computer receiving at least one of the sense signals $S_{Sense1}$, $S_{Sense2}$, . . . , $S_{SenseM}$ at the time $t_3$. As discussed above, the sense signals $S_{Sense1}$, $S_{Sense2}$, . . . , $S_{SenseM}$ are provided by the corresponding sensors 140a, 140b, . . . , 140M of the sensor array 140. In this particular example, the desired digital light spectrum map 103c can be displayed by the display device 102 in response to the computer receiving at least one of the sense signals $S_{Sense1}$, $S_{Sense2}$, $S_{Sense3}$, and $S_{Sense4}$ at the time $t_2$. As discussed above, the sense signals $S_{Sense1}$, $S_{Sense2}$, $S_{Sense3}$, and $S_{Sense4}$ are provided by the corresponding sensors 140a, 140b, 140c, and 140d of the sensor array 140. In this way, the computer 101 provides the desired digital light spectrum map 103c at the time $t_3$.

It should be noted that the desired digital light spectrum map 103c can be provided by the computer 101 in response to processing the data of the sense signals $S_{Sense1}$, $S_{Sense2}$, $S_{Sense3}$, . . . , $S_{SenseM}$. In general, the data of the sense signals $S_{Sense1}$, $S_{Sense2}$, $S_{Sense3}$, . . . , $S_{SenseM}$ can be processed in many different ways, such as by applying a curve fit thereto. In FIG. 2c, the data of the sense signals sense signals $S_{Sense1}$, $S_{Sense2}$, $S_{Sense3}$, . . . , $S_{SenseM}$ is represented by the display device 102 as one or more colors, which are discussed above with FIG. 2a.

In operation, the desired digital light spectrum map 103c is provided in response to the operation of the grow light array 110. In particular, the grow light array 110 conditions the second digital light spectrum map 103b of FIG. 2b to match the desired digital light spectrum map 103c of FIG. 2c. The grow light array 110 can condition the second digital light spectrum map 103b to match the desired digital light spectrum map 103c in many different ways. In this embodiment, the grow light array drives the sense signals $S_{Sense1}$, $S_{Sense2}$, $S_{Sense3}$, and $S_{Sense4}$ at the time $t_2$ to match the sense signals $S_{Sense1}$, $S_{Sense2}$, $S_{Sense3}$, and $S_{Sense4}$ at the time $t_3$. In general, the grow light array 110 drives the sense signals $S_{Sense1}$, $S_{Sense2}$, $S_{Sense3}$, . . . , $S_{SenseM}$ at the time $t_2$ to match the sense signals $S_{Sense1}$, $S_{Sense2}$, $S_{Sense3}$, . . . , $S_{SenseM}$ at the time $t_3$. In this way, the second digital light spectrum map 103b is driven to match the desired digital light spectrum map 103c of the area 107 in response to the operation of the grow light array 110. It should be noted that, in FIGS. 2a, 2b, and 2c, that time $t_3$ is greater than time $t_2$, and time $t_2$ is greater than time $t_1$. Further, in FIGS. 2a, 2b, and 2c, time $t_1$ is less than time $t_2$, and time $t_2$ is less than time $t_3$.

Figure 3A:
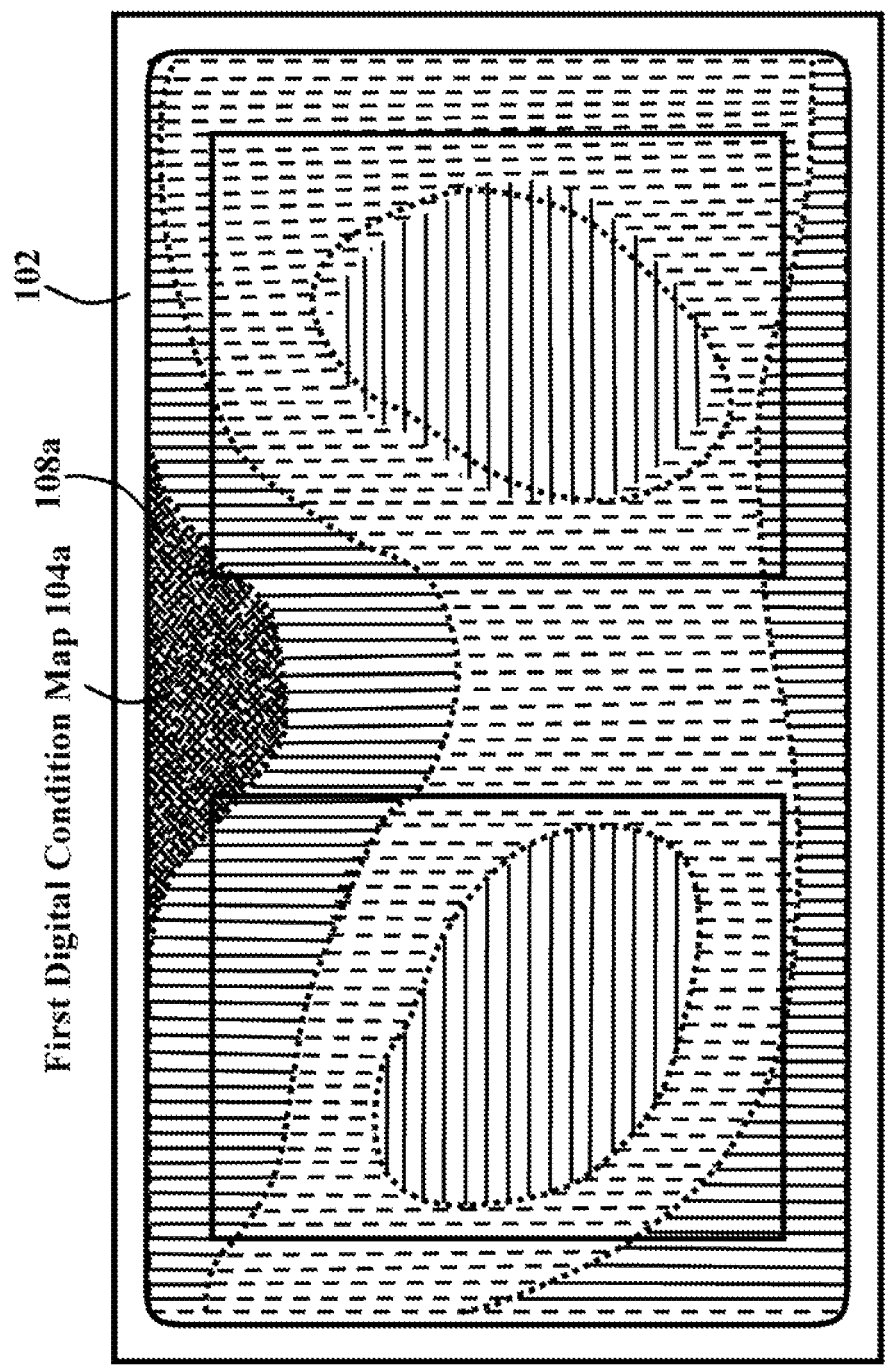
FIG. 3a is a view of a first digital condition map displayed by the computer of FIG. 1a, wherein the first digital condition map corresponds to an environmental parameter of the area of FIG. 1c at a time $t_4$.
Figure 3A:
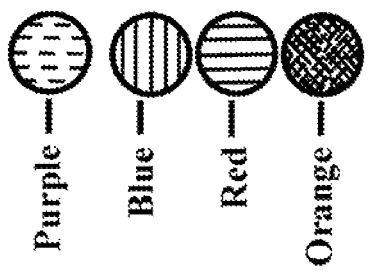

FIG. 3a is a view of a first digital condition map 104a displayed by the display device 102 of the computer 101 of the lighting system 100 of FIG. 1a, wherein the first digital condition map 104a corresponds to a plurality of environmental parameters of the area 107 of FIG. 1c at a time $t_4$. As discussed in more detail above, the lighting system 100 includes the sensor array 140 operatively coupled to the computer 101, and the environmental conditioning array 120 operatively coupled to the computer 101.

In this embodiment, the sensor array 140 includes one or more sensors, which determine corresponding sense parameters. As mentioned above, the sense parameters can correspond to many different types of parameters, such as light intensity, light color, temperature, humidity, gas type, wind speed, and wind direction, among others.

As mentioned above, it is often useful to drive the sense parameters to corresponding desired sense parameters. The sense parameters are driven to the corresponding desired sense parameters in response to driving the sense parameter values to the corresponding desired sense parameter values. In some situations, it is desirable to drive the difference between the sense parameter values and the corresponding desired sense parameter values to be predetermined sense parameter values. Useful corresponding predetermined sense parameter values are zero. However, there are typically other useful predetermined sense parameter values that can be used.

In this embodiment, the environmental conditioning array 120 includes one or more environmental conditioning devices, which adjust the environmental parameter. As mentioned above, the environmental parameter can be of many different types of parameters, such as temperature, humidity, gas type, wind speed, and wind direction, among others. The environmental parameter is one that is capable of being sensed by the sensor array 140.

It is often useful to drive the environmental parameters to corresponding desired environmental parameters. The environmental parameters are driven to the corresponding desired environmental parameters in response to driving the environmental parameter values to the corresponding desired environmental parameter values. In some situations, it is desirable to drive the difference between the environmental parameter values and the corresponding desired environmental parameter values to be predetermined environmental parameter values. Useful corresponding predetermined environmental parameter values are zero. However, there are typically other useful predetermined environmental parameter values that can be used.

The first digital condition map 104a can correspond to the plurality of environmental parameters in many different ways. In one embodiment, the first digital condition map 104a corresponds to the plurality of environmental parameters of the area 107 at the time $t_4$, wherein the plurality of environmental parameters correspond to environmental parameters proximate to the locations of the sensors. As discussed in more detail above, the environmental parameter values proximate to the sensors are adjustable in response to adjusting the operation of the environmental conditioning array 120. In one particular example, the first digital condition map 104a corresponds to the plurality of environmental parameter values proximate to the location parameters $P_1$, $P_2$, $P_3$, and $P_4$ at the time $t_4$. Further, the first digital condition map 104a corresponds to the plurality of environmental parameter values proximate to the location parameters $S_1$, $S_2$, $S_3$, and $S_4$ at the time $t_4$.

The computer 101 can provide the digital condition map 104a in many different ways, such as those discussed in more detail above. For example, the first digital condition map 104a can be displayed by the display device 102 in response to the computer 101 receiving the sense signal $S_{Sense}$ at the time $t_4$, wherein the sense signal $S_{Sense}$ is provided by the sensor array 140. The first digital condition map 104a can be displayed by the display device 102 in response to the computer receiving at least one of the sense signals $S_{Sense1}$, $S_{Sense2}$, . . . , $S_{SenseM}$ at the time $t_4$. As discussed above, the sense signals $S_{Sense1}$, $S_{Sense2}$, . . . , $S_{SenseM}$ are provided by the corresponding sensors 140a, 140b, . . . , 140M of the sensor array 140. In this particular example, first digital condition map 104a is displayed by the display device 102 in response to the computer receiving at least one of the sense signals $S_{Sense1}$, $S_{Sense2}$, $S_{Sense3}$, and $S_{Sense4}$ at the time $t_4$. As discussed above, the sense signals $S_{Sense1}$, $S_{Sense2}$, $S_{Sense3}$, and $S_{Sense4}$ are provided by the corresponding sensors 140a, 140b, 140c, and 140d of the sensor array 140. In this way, the computer 101 provides the first digital condition map 104a at the time $t_4$.

It should be noted that the first digital condition map 104a can be provided by the computer 101 in response to processing the data of the sense signals $S_{Sense1}$, $S_{Sense2}$, $S_{Sense}$, . . . , $S_{SenseM}$. The data of the sense signals $S_{Sense1}$, $S_{Sense2}$, $S_{Sense3}$, . . . , $S_{SenseM}$ can be processed in many different ways, such as by applying a curve fit thereto. In FIG. 2a, the data of the sense signals sense signals $S_{Sense1}$, $S_{Sense2}$, $S_{Sense3}$, . . . , $S_{SenseM}$ is represented by the display device 102 as one or more colors. In this particular example, the colors are purple, blue, red, and orange. However, it should be noted that other colors can be used, and the purple, blue, red, and orange are used for illustrative purposes. The colors purple, blue, red, and orange represent a first color spectrum $CS_1$, second color spectrum $CS_2$, third color spectrum $CS_3$, and fourth color spectrum $CS_4$, respectively.

In this embodiment, the first color spectrum $CS_1$ (purple) includes wavelengths less than the second color spectrum $CS_2$ (blue), the first color spectrum $CS_1$ (purple) includes wavelengths less than the third color spectrum $CS_3$ (red), and the first color spectrum $CS_1$ (purple) includes wavelengths less than the fourth color spectrum $CS_4$ (orange). In some embodiments, the first color spectrum $CS_1$ (purple) consists of wavelengths less than the second color spectrum $CS_2$ (blue), the first color spectrum $CS_1$ (purple) consists of wavelengths less than the third color spectrum $CS_3$ (red), and the first color spectrum $CS_1$ (purple) consists of wavelengths less than the fourth color spectrum $CS_4$ (orange). Further, in some embodiments, the first color spectrum $CS_1$ (purple) consists essentially of wavelengths less than the second color spectrum $CS_2$ (blue), the first color spectrum $CS_1$ (purple) consists essentially of wavelengths less than the third color spectrum $CS_3$ (red), and the first color spectrum $CS_1$ (purple) consists essentially of wavelengths less than the fourth color spectrum $CS_4$ (orange).

In this embodiment, the second color spectrum $CS_2$ (blue) includes wavelengths greater than the first color spectrum $CS_1$ (purple), the second color spectrum $CS_2$ (blue) includes wavelengths less than the third color spectrum $CS_3$ (red), and the second color spectrum $CS_2$ (blue) includes wavelengths less than the fourth color spectrum $CS_4$ (orange). In some embodiments, the second color spectrum $CS_2$ (blue) consists of wavelengths greater than the first color spectrum $CS_1$ (purple), the second color spectrum $CS_2$ (blue) consists of wavelengths less than the third color spectrum $CS_3$ (red), and the second color spectrum $CS_2$ (blue) consists of wavelengths less than the fourth color spectrum $CS_4$ (orange). Further, in some embodiments, the second color spectrum $CS_2$ (blue) consists essentially of wavelengths greater than the first color spectrum $CS_1$ (purple), the second color spectrum $CS_2$ (blue) consists essentially of wavelengths less than the third color spectrum $CS_3$ (red), and the second color spectrum $CS_2$ (blue) consists essentially of wavelengths less than the fourth color spectrum $CS_4$ (orange).

In this embodiment, the third color spectrum $CS_3$ (red) includes wavelengths greater than the first color spectrum $CS_1$ (purple), the third color spectrum $CS_3$ (red) includes wavelengths greater than the second color spectrum $CS_2$ (blue), and the third color spectrum $CS_3$ (red) includes wavelengths less than the fourth color spectrum $CS_4$ (orange). In some embodiments, the third color spectrum $CS_3$ (red) consists of wavelengths greater than the first color spectrum $CS_1$ (purple), the third color spectrum $CS_3$ (red) consists of wavelengths greater than the second color spectrum $CS_2$ (blue), and the third color spectrum $CS_3$ (red) consists of wavelengths less than the fourth color spectrum $CS_4$ (orange). Further, in some embodiments, the third color spectrum $CS_3$ (red) consists essentially of wavelengths greater than the first color spectrum $CS_1$ (purple), the third color spectrum $CS_3$ (red) consists essentially of wavelengths greater than the second color spectrum $CS_2$ (blue), and the third color spectrum $CS_3$ (red) consists essentially of wavelengths less than the fourth color spectrum $CS_4$ (orange).

In this embodiment, the fourth color spectrum $CS_4$ (orange) includes wavelengths greater than the first color spectrum $CS_1$ (purple), the fourth color spectrum $CS_4$ (orange) includes wavelengths greater than the second color spectrum $CS_2$ (blue), and the fourth color spectrum $CS_4$ (orange) includes wavelengths greater than the third color spectrum $CS_3$ (red). In some embodiments, the fourth color spectrum $CS_4$ (orange) consists of wavelengths greater than the first color spectrum $CS_1$ (purple), the fourth color spectrum $CS_4$ (orange) consists of wavelengths greater than the second color spectrum $CS_2$ (blue), and the fourth color spectrum $CS_4$ (orange) consists of wavelengths greater than the third color spectrum $CS_3$ (red). Further, in some embodiments, the fourth color spectrum $CS_4$ (orange) consists essentially of wavelengths greater than the first color spectrum $CS_1$ (purple), the fourth color spectrum $CS_4$ (orange) consists essentially of wavelengths greater than the second color spectrum $CS_2$ (blue), and the fourth color spectrum $CS_4$ (orange) consists essentially of wavelengths greater than the third color spectrum $CS_3$ (red).

As will be discussed in more detail presently, the digital condition map 104a can be driven to match a desired digital condition map 104c (FIG. 3c) in response to the operation of the environmental conditioning array 120. In particular, the digital condition map 104a can be driven to match the desired digital condition map 104c of the area 107 (FIG. 1c) in response to the operation of the environmental conditioning array 120. For illustrative purposes, it is desirable to adjust one or more of the environmental parameters to adjust digital condition map 104a proximate to a region 108a of FIG. 3a, as will be discussed with reference to FIGS. 3b and 3c.

Figure 3B:
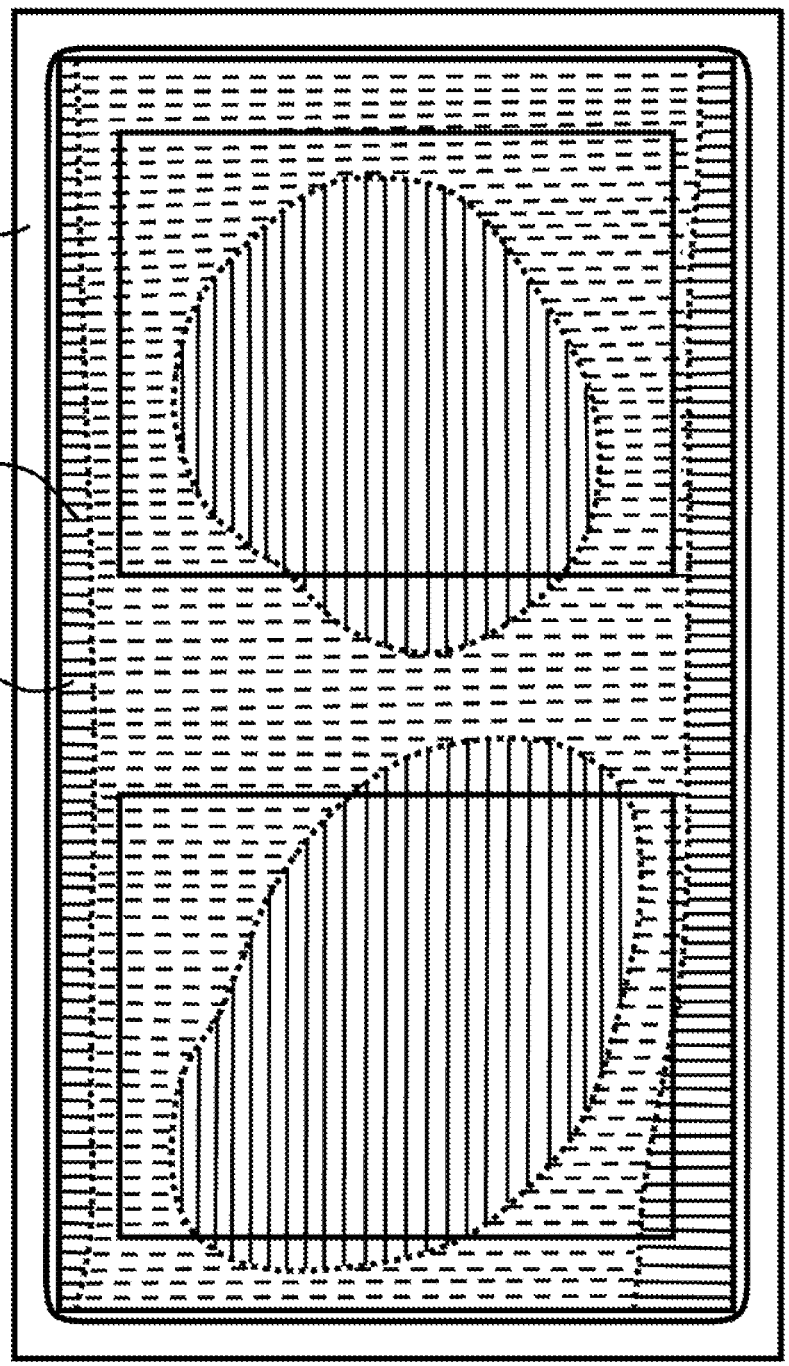
FIG. 3b is a view of a second digital condition map displayed by the computer of FIG. 1a, wherein the second digital condition map corresponds to an environmental parameter of the area of FIG. 1c at a time $t_5$.

FIG. 3b is a view of a second digital condition map 104b displayed by the display device 102 of the computer 101 of the lighting system 100 of FIG. 1a, wherein the second digital condition map 104b corresponds to a plurality of environmental parameters of the area 107 of FIG. 1c at a time $t_5$.

In this embodiment, the second digital condition map 104b can correspond to the plurality of environmental parameters in many different ways. In one embodiment, the second digital condition map 103b corresponds to at least one environmental parameter of the area 107 at the time $t_5$, wherein the environmental parameter corresponds to the environmental parameter value proximate to the locations of the sensors. In one particular example, the second digital condition map 103b corresponds to the plurality of environmental parameters proximate to the location parameters $P_1$, $P_2$, $P_3$, and $P_4$ at the time $t_5$. Further, the second digital condition map 103b corresponds to the plurality of environmental parameters values proximate to the location parameters $S_1$, $S_2$, $S_3$, and $S_4$ at the time $t_5$.

The computer 101 can provide the digital condition map 103b in many different ways, such as those discussed in more detail above. For example, the second digital condition map 103b can be displayed by the display device 102 in response to the computer 101 receiving the sense signal $S_{Sense}$ at the time $t_5$, wherein the sense signal $S_{Sense}$ is provide by the sensor array 140. The second digital condition map 103b can be displayed by the display device 102 in response to the computer receiving at least one of the sense signals $S_{Sense1}$, $S_{Sense2}$, . . . , $S_{SenseM}$ at the time $t_5$. As discussed above, the sense signals $S_{Sense1}$, $S_{Sense2}$, . . . , $S_{SenseM}$ are provided by the corresponding sensors 140a. 140b, . . . , 140M of the sensor array 140. In this particular example, the second digital condition map 103b can be displayed by the display device 102 in response to the computer receiving at least one of the sense signals $S_{Sense1}$, $S_{Sense2}$, $S_{Sense3}$, and $S_{Sense4}$ at the time $t_5$. As discussed above, the sense signals $S_{Sense1}$, $S_{Sense2}$, $S_{Sense3}$, and $S_{Sense4}$ are provided by the corresponding sensors 140a. 140b, 140c, and 140d of the sensor array 140. In this way, the computer 101 provides the second digital condition map 103b at the time $t_5$.

It should be noted that the second digital condition map 103b can be provided by the computer 101 in response to processing the data of the sense signals $S_{Sense1}$, $S_{Sense2}$, $S_{Sense3}$, . . . , $S_{SenseM}$. In general, the data of the sense signals $S_{Sense1}$, $S_{Sense2}$, $S_{Sense3}$, . . . , $S_{SenseM}$ can be processed in many different ways, such as by applying a curve fit thereto. In FIG. 2b, the data of the sense signals sense signals $S_{Sense1}$, $S_{Sense2}$, $S_{Sense3}$, . . . , $S_{SenseM}$ is represented by the display device 102 as one or more colors, which are discussed above with FIG. 3a.

In operation, the second digital condition map 103b is provided in response to the operation of the environmental conditioning array 120. In particular, the grow light array 110 conditions the first digital condition map 103b of FIG. 2a to match the second digital condition map 103b of FIG. 2b. The grow light array 110 can condition the first digital condition map 103a to match the second digital condition map 103b in many different ways. In this embodiment, the grow light array drives the sense signals $S_{Sense1}$, $S_{Sense2}$, $S_{Sense3}$, and $S_{Sense4}$ at the time $t_4$ to match the sense signals $S_{Sense1}$, $S_{Sense2}$, $S_{Sense3}$, and $S_{Sense4}$ at the time $t_5$. In general, the grow light array 110 drives the sense signals $S_{Sense1}$, $S_{Sense2}$, $S_{Sense3}$, . . . , $S_{SenseM}$ at the time $t_4$ to match the sense signals $S_{Sense1}$, $S_{Sense2}$, $S_{Sense3}$, . . . , $S_{SenseM}$ at the time $t_5$. In this way, the first digital condition map 103a is driven to match the second digital condition map 103b of the area 107 in response to the operation of the grow light array 110.

It should be noted that the second digital light spectrum map 104b can be driven to match the desired digital light spectrum map 104c in response to the operation of the grow light array 110. In particular, the second digital light spectrum map 104b can be driven to match the desired digital light spectrum map 104c of the area 107 in response to the operation of the environmental conditioning array 120. For illustrative purposes, it is desirable to adjust one or more of the light spectrum parameters to adjust the second digital signal light spectrum map 104b proximate to a region 108b of FIG. 3b, as will be discussed with reference to FIGS. 23 and 3c.

Figure 3C:
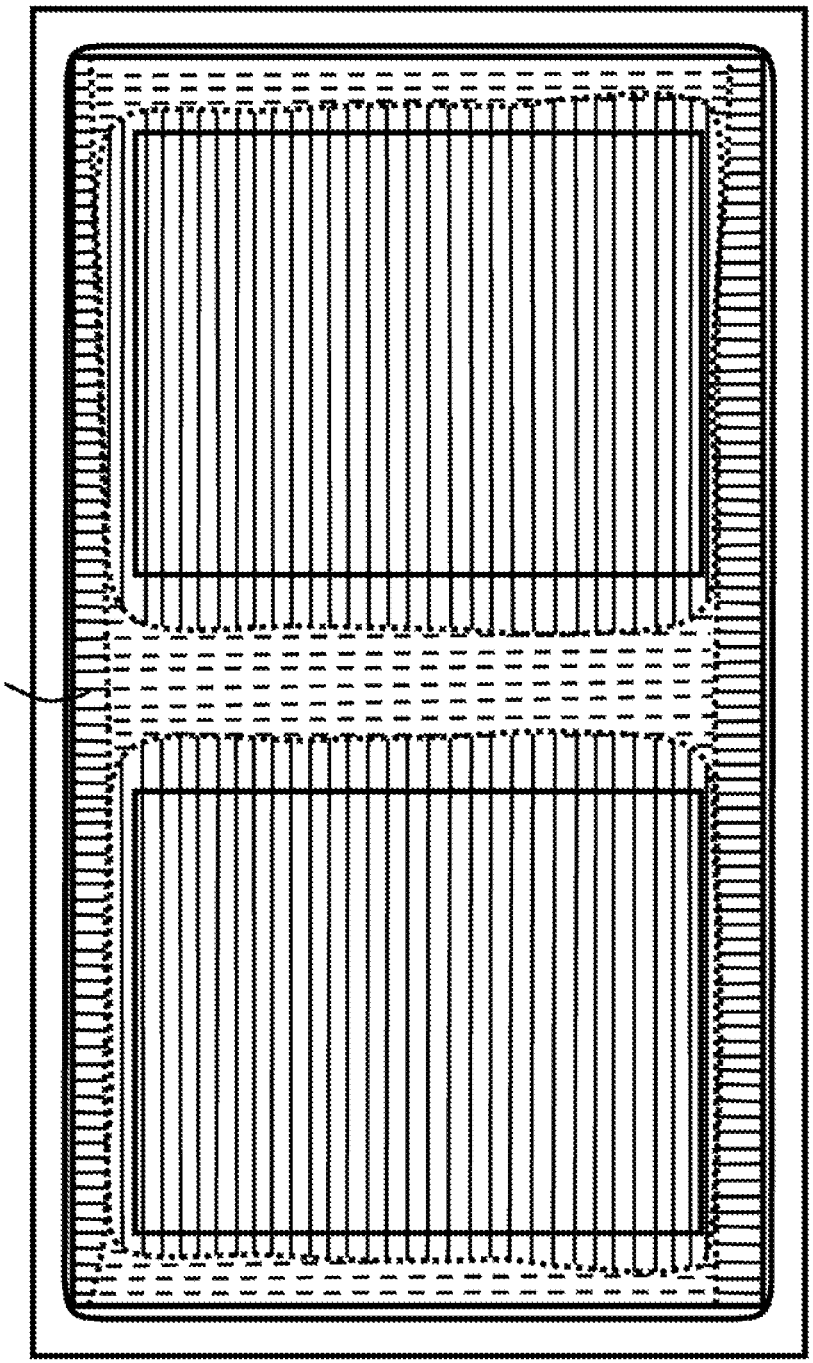
FIG. 3c is a view of a desired digital condition map displayed by the computer of FIG. 1, wherein the desired digital condition map corresponds to an environmental parameter of the area of FIG. 1c at a time $t_6$.

FIG. 3c is a view of a desired digital condition map 104c displayed by the display device 102 of the computer 101 of the lighting system 100 of FIG. 1a, wherein the desired digital condition map 104c corresponds to a plurality of environmental parameters of the area 107 of FIG. 1c at a time $t_6$.

In this embodiment, the desired digital condition map 104c corresponds to the light spectrum parameter, wherein the light spectrum parameter is discussed in more detail above. The desired digital condition map 104c can correspond to the light spectrum parameter in many different ways. In one embodiment, the desired digital condition map 104c corresponds to at least one light spectrum parameter of the area 107 at the time $t_6$, wherein the light spectrum parameter corresponds to the light spectrum value proximate to the locations of the sensors. In one particular example, the desired digital condition map 104c corresponds to the light spectrum parameters proximate to the location parameters $P_1$, $P_2$, $P_3$, and $P_4$ at the time $t_6$. Further, the desired digital condition map 104c corresponds to the light spectrum values proximate to the location parameters $S_1$, $S_2$, $S_3$, and $S_4$ at the time $t_6$.

The computer 101 can provide the desired digital condition map 104c in many different ways, such as those discussed in more detail above. For example, the desired digital condition map 104c can be displayed by the display device 102 in response to the computer 101 receiving the sense signal $S_{Sense}$ at the time $t_6$, wherein the sense signal $S_{Sense}$ is provide by the sensor array 140. The desired digital condition map 104c can be displayed by the display device 102 in response to the computer receiving at least one of the sense signals $S_{Sense1}$, $S_{Sense2}$, . . . , $S_{SenseM}$ at the time $t_6$. As discussed above, the sense signals $S_{Sense1}$, $S_{Sense2}$, . . . , $S_{SenseM}$ are provided by the corresponding sensors 140a, 140b, . . . , 140M of the sensor array 140. In this particular example, the desired digital condition map 104c can be displayed by the display device 102 in response to the computer receiving at least one of the sense signals $S_{Sense1}$, $S_{Sense2}$, $S_{Sense3}$, and $S_{Sense4}$ at the time $t_5$. As discussed above, the sense signals $S_{Sense1}$, $S_{Sense2}$, $S_{Sense3}$, and $S_{Sense4}$ are provided by the corresponding sensors 140a. 140b, 140c, and 140d of the sensor array 140. In this way, the computer 101 provides the desired digital condition map 104c at the time $t_6$.

It should be noted that the desired digital condition map 104c can be provided by the computer 101 in response to processing the data of the sense signals $S_{Sense1}$, $S_{Sense2}$, $S_{Sense3}$, . . . , $S_{SenseM}$. In general, the data of the sense signals $S_{Sense1}$, $S_{Sense2}$, $S_{Sense3}$, . . . , $S_{SenseM}$ can be processed in many different ways, such as by applying a curve fit thereto. In FIG. 2c, the data of the sense signals sense signals $S_{Sense1}$, $S_{Sense2}$, $S_{Sense3}$, . . . , $S_{SenseM}$ is represented by the display device 102 as one or more colors, which are discussed above with FIG. 2a.

In operation, the desired digital condition map 104c is provided in response to the operation of the grow light array 110. In particular, the grow light array 110 conditions the second digital condition map 104b of FIG. 2b to match the desired digital condition map 104c of FIG. 2c. The grow light array 110 can condition the second digital condition map 104b to match the desired digital condition map 104c in many different ways. In this embodiment, the grow light array drives the sense signals $S_{Sense1}$, $S_{Sense2}$, $S_{Sense3}$, and $S_{Sense4}$ at the time $t_5$ to match the sense signals $S_{Sense1}$, $S_{Sense2}$, $S_{Sense3}$, and $S_{Sense4}$ at the time $t_6$. In general, the grow light array 110 drives the sense signals $S_{Sense1}$, $S_{Sense2}$, $S_{Sense3}$, . . . , $S_{SenseM}$ at the time $t_5$ to match the sense signals $S_{Sense1}$, $S_{Sense2}$, $S_{Sense3}$, . . . , $S_{SenseM}$ at the time $t_6$. In this way, the second digital condition map 104b is driven to match the desired digital condition map 104c of the area 107 in response to the operation of the grow light array 110. It should be noted that, in FIGS. 3a, 3b, and 3c, that time $t_6$ is greater than time $t_5$, and time $t_5$ is greater than time $t_4$. Further, in FIGS. 3a, 3b, and 3c, time $t_4$ is less than time $t_5$, and time $t_5$ is less than time $t_6$.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. An apparatus, comprising:
  a computer;
  a grow light array operatively coupled to the computer; and
  a sensor array operatively coupled to the computer;
  wherein at least one sensor in the sensor array is movable independent of a grow light of the grow light array configured to provide a light output incident upon the at least one sensor;
  wherein the sensor array is configured to determine a light spectrum sense parameter, generate a sense signal including the light spectrum sense parameter, and provide the sense signal to the computer;
  wherein the computer is configured to receive the sense signal and provide a grow light signal to the grow light array to adjust a spectrum of light output from the grow light array to adjust the light spectrum sense parameter to match a desired light spectrum sense parameter.

2. The apparatus of claim 1, wherein the computer includes a display device, which displays a digital light spectrum map corresponding to the light spectrum sense parameter as a function of position.

3. The apparatus of claim 2, wherein the grow light array adjusts the spectrum of light to drive the digital light spectrum map to match a desired digital light spectrum map.

4. The apparatus of claim 2, wherein the digital light spectrum map is adjusted in response to adjusting the position of the grow light array.

5. The apparatus of claim 1, wherein the computer includes a display device, which displays a digital light intensity map corresponding to the light intensity sense parameter as a function of position.

6. The apparatus of claim 5, wherein the grow light array adjusts an intensity of light to drive a light intensity sense parameter, determined by the sensor array, to match a desired light intensity sense parameter.

7. The apparatus of claim 6, wherein the grow light array adjusts the intensity of light to drive the digital light intensity map to match a desired digital light intensity map.

8. The apparatus of claim 6, wherein the digital light intensity map is adjusted in response to adjusting the position of the grow light array.

9. An apparatus, comprising:
  a computer; and
  a grow light array operatively coupled to the computer, wherein the grow light array includes a plurality of grow lights;
  wherein the computer determines a location parameter of each grow light of the grow light array, the location parameter corresponding to the location of a corresponding grow light;
  wherein the computer provides a digital location map corresponding to the location parameters;
  wherein the digital location map is adjusted in response to adjusting the location of at least one grow light of the grow light array.

10. The apparatus of claim 9, wherein the computer provides a digital light spectrum map corresponding to the amount of light provided by the grow light array.

11. The apparatus of claim 10, further including a sensor array which determines the amount of light provided by the grow light array, the sensor array being operatively coupled to the computer.

12. The apparatus of claim 10, wherein the digital light spectrum map is driven to a desired digital light spectrum map in response to adjusting the location of at least one grow light of the grow light array.

13. The apparatus of claim 9, wherein the amount of light provided by at least one grow light of the grow light array is adjusted in response to adjusting a selected location parameter.

14. The apparatus of claim 9, wherein the computer determines the location parameter of each grow light in the grow light array using trilateralization.

15. An apparatus, comprising:
  a computer; and
  a grow light array operatively coupled to the computer, wherein the grow light array includes a plurality of grow lights;
  wherein the computer determines a location parameter of each grow light of the grow light array, the location parameter corresponding to the location of a corresponding grow light;
  wherein the grow light array adjusts an intensity of light to drive a light intensity sense parameter to match a desired light intensity sense parameter.

16. The apparatus of claim 15, wherein the intensity of light provided by at least one grow light of the grow light array is adjusted to adjust the light intensity sense parameter.

17. The apparatus of claim 15, wherein the computer provides a digital location map corresponding to the location parameters.

18. The apparatus of claim 17, wherein the digital location map is adjusted in response to adjusting the location of at least one grow light of the grow light array.

19. The apparatus of claim 15, wherein the computer determines the location parameter of each grow light in the grow light array using trilateralization.

20. The apparatus of claim 15, wherein the grow light array adjusts a spectrum of light to drive a light spectrum sense parameter to match a desired light spectrum sense parameter.

21. An apparatus, comprising:
  a computer;
  a grow light array operatively coupled to the computer; and
  a sensor operatively coupled to the computer;
  wherein the sensor is carried by the computer;
  wherein at least one grow light in the grow light array is configured to provide a light output incident upon the sensor and is movable in relation to the sensor;
  wherein the sensor is configured to determine a light spectrum sense parameter, generate a sense signal including the light spectrum sense parameter, and provide the sense signal to the computer;
  wherein the computer is configured to receive the sense signal and provide a grow light signal to the grow light array to adjust the spectrum of light output from the grow light array to adjust the light spectrum sense parameter to match a desired light spectrum sense parameter.

\* \* \* \* \*